US012586901B2

(12) United States Patent
Yun et al.

(10) Patent No.: US 12,586,901 B2
(45) Date of Patent: Mar. 24, 2026

(54) WIDEBAND ANTENNA ARRANGED ON VEHICLE

(71) Applicant: LG ELECTRONICS INC., Seoul (KR)

(72) Inventors: Changwon Yun, Seoul (KR); Yongkon Kim, Seoul (KR); Yeomin Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 18/698,534

(22) PCT Filed: Oct. 7, 2021

(86) PCT No.: PCT/KR2021/013781
§ 371 (c)(1),
(2) Date: Apr. 4, 2024

(87) PCT Pub. No.: WO2023/058791
PCT Pub. Date: Apr. 13, 2023

(65) Prior Publication Data
US 2025/0239766 A1 Jul. 24, 2025

(51) Int. Cl.
*H01Q 5/371* (2015.01)
*H01Q 1/32* (2006.01)
*H01Q 3/34* (2006.01)

(52) U.S. Cl.
CPC ........... *H01Q 5/371* (2015.01); *H01Q 1/3233* (2013.01); *H01Q 3/34* (2013.01)

(58) Field of Classification Search
CPC ............ H01Q 5/371; H01Q 5/25; H01Q 5/50; H01Q 1/3233; H01Q 1/1271;
(Continued)

(56) References Cited

U.S. PATENT DOCUMENTS 6,246,371 B1 * 6/2001 Kurz ...................... H01Q 5/357
343/702
2005/0195124 A1 9/2005 Puente Baliarda et al.
(Continued)

FOREIGN PATENT DOCUMENTS

JP 2022171556 A * 11/2022 ............... H01Q 1/48
KR 10-2008-0016353 2/2008
(Continued)

OTHER PUBLICATIONS

PCT International Application No. PCT/KR2021/013780, International Search Report dated Jul. 6, 2022, 6 pages.
(Continued)

*Primary Examiner* — Seokjin Kim
(74) *Attorney, Agent, or Firm* — LEE, HONG, DEGERMAN, KANG & WAIMEY

(57) ABSTRACT

An antenna module mounted on a vehicle, according to an embodiment, comprises: a PCB on which a transmission line is formed; and an antenna element coupled to the PCB and configured such that metal patterns are interconnected on a surface thereof in a first axial direction and in a second axial direction perpendicular to the first axial direction. The metal patterns comprise: a first branch line arranged such that the metal patterns arranged in the first axis direction have lengths overlapping each other on the second axis; and a second branch line extending from an end of the first branch line connected to the PCB, to a portion parallel to the PCB, so as to be perpendicular to the PCB.

19 Claims, 21 Drawing Sheets

(58) Field of Classification Search
CPC .......... H01Q 1/3275; H01Q 1/32; H01Q 1/38; H01Q 1/48; H01Q 3/34; H01Q 3/02; H01Q 9/40; H01Q 21/30; H04B 7/0617; H04B 7/0413; H05K 1/0243; H05K 2201/10098
See application file for complete search history.

(56) References Cited

U.S. PATENT DOCUMENTS

| | | | | |
|---|---|---|---|---|
| 2007/0046548 | A1 | 3/2007 | Pros et al. | |
| 2017/0077596 | A1* | 3/2017 | Martínez Ortigosa .. | H01Q 1/42 |
| 2020/0112101 | A1* | 4/2020 | Yun .......................... | H01Q 1/38 |

FOREIGN PATENT DOCUMENTS

| | | | | |
|---|---|---|---|---|
| KR | 10-0843150 | | 7/2008 | |
| KR | 10-2009-0051964 | | 5/2009 | |
| KR | 10-2015-0076630 | | 7/2015 | |
| KR | 10-2017-0071089 | | 6/2017 | |
| WO | WO-2017135229 | A1 * | 8/2017 | ............... H01Q 1/32 |
| WO | WO-2017213243 | A1 * | 12/2017 | ............. H01Q 21/08 |

OTHER PUBLICATIONS

Korean Intellectual Property Office Application No. 10-2024-7009081, Office Action dated May 14, 2025, 5 pages.

* cited by examiner (a)

(b)

WIDEBAND ANTENNA ARRANGED ON VEHICLE

CROSS-REFERENCE TO RELATED APPLICATION

This application is the National Stage filing under 35 U.S.C. 371 of International Application No. PCT/KR2021/013781, filed on Oct. 7, 2021, the contents of which are hereby incorporated by reference herein its entirety.

TECHNICAL FIELD

This specification relates to a wideband antenna disposed in a vehicle, and more particularly, to an antenna module having a wideband antenna that is capable of operating in various communication systems, and to a vehicle having the same.

BACKGROUND ART

A vehicle may perform wireless communication services with other vehicles or nearby objects, infrastructures, or a base station. In this regard, various communication services may be provided using Long Term Evolution (LTE) communication, 5G communication, or WiFi communication technology.

In order to provide these various wireless communication services in a vehicle, an antenna may be disposed on a glass of the vehicle, above or below a roof of the vehicle. When the antenna is disposed on the glass of the vehicle, it may be implemented with a transparent antenna material. Meanwhile, when the antenna is disposed above or below the roof of the vehicle, an effect on a vehicle body and the roof of the vehicle may cause a change in antenna performance.

In this regard, there is a problem in that a vehicle body and a vehicle roof are formed of a metallic material to block radio waves. Accordingly, a separate antenna structure may be disposed on a top of the vehicle body or the vehicle roof. Or, when the antenna structure is disposed on a bottom of the vehicle body or roof, a portion of the vehicle body or roof corresponding to a region where the antenna structure is disposed may be formed of a non-metallic material.

Meanwhile, in order to provide WiFi communication services in a vehicle, a WiFi communication antenna needs to be provided in the vehicle. In relation to these WiFi communication services, the vehicle WiFi antenna needs to be configured to operate in a 5 GHz band and a 6 GHz band in addition to a 2.4 GHz band. In this regard, existing antenna elements are implemented as resonance antenna elements with a limited bandwidth, so there is a problem in that bandwidth characteristics are limited.

In addition, a vehicle antenna needs to form an antenna beam within a predetermined angle range in a horizontal direction rather than a vertical direction. In this regard, an antenna beam pattern formed within a predetermined angle range in the horizontal direction may be referred to as a low-elevation beam pattern. Meanwhile, there is a problem in that no specific structure for configuring the antenna element has been proposed to implement such a low-elevation beam pattern.

DISCLOSURE OF INVENTION

Technical Problem

The present disclosure is directed to solving the aforementioned problems and other drawbacks. In addition, another aspect of the present disclosure is to provide a wideband antenna element capable of performing a wideband operation while being disposed in a vehicle.

Another aspect of the present disclosure is to provide a wideband antenna element so as to implement Wi-Fi 6 and Wi-Fi 7 communication services in 5 GHz and 6 GHz bands in addition to the existing Wi-Fi band within a vehicle.

Another aspect of the present disclosure is to implement a low-elevation beam pattern in a vehicle.

Another aspect of the present disclosure is to provide a high-efficiency wideband antenna element having a high antenna gain while operating in a wide bandwidth.

Another aspect of the present disclosure is to maintain antenna performance at a predetermined level even in case where the exterior of a vehicle body or roof is made of a metallic material.

Another aspect of the present disclosure is to improve antenna performance of an antenna system while maintaining a height of the antenna system at a predetermined level or less.

Another aspect of the present disclosure is to provide a structure for mounting an antenna system, which is capable of operating in a broad frequency band to support various communication systems, to a vehicle.

Solution to Problem

In order to achieve those aspects or other purposes, there is provided an antenna module mounted on a vehicle, including: a printed circuit board (PCB) with transmission lines formed thereon; and an antenna element coupled to the PCB 1200, and configured such that metal patterns on one surface thereof are interconnected in a first axial direction and a second axial direction perpendicular to the first axial direction. The metal patterns may include: a first branch line configured such that metal patterns disposed in the first axial direction have an overlapped length on the second axis; and a second branch line extending from an end of the first branch line connected to the PCB, to a portion parallel to the PCB to be perpendicular to the PCB.

According to an embodiment, the first branch line may include first metal patterns disposed parallel to the second axis in a segmented form at a first point on the first axis, and second metal patterns disposed parallel to the first metal patterns in a segmented form at a second point on the first axis. The first branch line may further include: third metal patterns disposed parallel to the second metal patterns in a segmented form at a third point on the first axis; fourth metal patterns configured to connect the first metal patterns and the second metal patterns and disposed parallel to the first axis; and fifth metal patterns configured to connect the second metal patterns and the third metal patterns, and disposed parallel to the first axis.

According to an embodiment, the second metal patterns may be disposed to have an overlapped length with the first metal patterns and the third metal patterns on the second axis. The antenna element may form a low-elevation beam pattern by a vertical current component on the second axis of the first to third metal patterns having the overlapped length.

According to an embodiment, the fourth metal patterns disposed in parallel on the first axis may alternately be disposed on the second axis at a first spacing and a second spacing wider than the first spacing. The fifth metal patterns disposed in parallel on the first axis may be alternately disposed on the second axis at a third spacing and a fourth spacing narrower than the third spacing.

According to an embodiment, currents may be formed in opposite directions in the first metal pattern and the second metal pattern disposed to have a first spaced distance on the first axis and a first overlapped length on the second axis, to form a first capacitive component of the antenna element. Currents may be formed in opposite directions in the second metal pattern and the third metal pattern disposed to have a second spaced distance on the first axis and a second overlapped length on the second axis, to form a second capacitive component of the antenna element.

According to an embodiment, currents may be formed in opposite directions on the first axis in metal patterns, disposed at the first spacing on the second axis, among the fourth metal patterns, to form a third capacitive component of the antenna element. Currents may be formed in opposite directions on the first axis in metal patterns, disposed at the fourth spacing on the second axis, among the fifth metal patterns, to form a fourth capacitive component of the antenna element.

According to an embodiment, the antenna element may form a first inductive component by an antenna length by the first to fifth metal patterns, form a second inductive component by current formed in a first direction on the second axis in the first metal pattern and the third metal pattern, and form a third inductive component by current formed in a second direction on the second axis in the second metal pattern. The antenna element may operate as a radiator in the first to third bands by a combination of the first to third inductive components and the first to fourth capacitive components.

According to an embodiment, the antenna element may form a fourth inductive component by a first combination of metal patterns, in which current is formed equally in a first direction on the first axis, and a second combination of metal patterns, in which current is formed equally in a second direction on the first axis, among the fourth metal patterns. The antenna element may form a fifth inductive component by a first combination of metal patterns, in which current is formed equally in the first direction on the first axis, and a second combination of metal patterns, in which current is formed equally in the second direction on the first axis, among the fifth metal patterns. The antenna element may operate as a radiator in the first to third bands by a combination of the first to fifth inductive components and the first to fourth capacitive components.

According to an embodiment, the antenna element may operate as a radiator in a first band by current, which is formed in a first direction on the second axis in the first metal pattern and the third metal pattern constituting the first branch line. The antenna element may form a low-elevation radiation pattern in the first band by current, which is formed vertically to the first branch line corresponding to an upper region of the second branch line.

According to an embodiment, the antenna element may operate as a radiator in a second band higher than the first band by current, which is formed in the first direction by the metal patterns, disposed in the second axial direction, among the metal patterns constituting the second branch line. The antenna element may form a low-elevation radiation pattern in the second band by current formed vertical to the second branch line.

According to an embodiment, the antenna element may operate as a radiator in a third band higher than the second band by current, which is formed in the first direction by metal patterns, disposed in the second axial direction, among metal patterns constituting the first branch line and the second branch line. The antenna element may form a low-elevation radiation pattern in the third band by currents formed vertical to the first branch line and the second branch line.

According to an embodiment, the first to fifth metal patterns may operate as a radiator having twist-shaped metal patterns in which currents are formed in opposite directions.

According to an embodiment, the fourth metal patterns may alternately have a first structure with a pair of adjacent metal patterns disposed at a first spacing and a second structure with a pair of adjacent metal patterns disposed at a second spacing larger than the first spacing on the second axis. The fifth metal patterns may alternately have the second structure with a pair of adjacent metal patterns disposed at the second spacing and the first structure with a pair of adjacent metal patterns disposed at the first spacing smaller than the second spacing on the second axis.

According to an embodiment, the first to fifth metal patterns may operate as a radiator having twist-shaped metal patterns, in which currents are formed in the opposite directions, through the structure in which the fourth metal patterns are disposed in parallel at the first spacing and the second spacing and the structure in which the fifth metal patterns are disposed in parallel at the second spacing and the first spacing.

According to an embodiment, the first to fifth metal patterns may include: a first metal pattern pair that is disposed in parallel in the first axial direction or the second axial direction and forms currents in the same direction; and a second metal pattern pair that is disposed in parallel in the first axial direction or the second axial direction and forms currents in opposite directions. The first metal pattern pair may form an inductive component of the antenna element, and the second metal pattern pair may form an inductive component of the antenna element.

According to an embodiment, the antenna element on which the first branch line and the second branch line including the first to fifth metal patterns are formed may disposed perpendicular to the PCB. The antenna element may be coupled to the PCB to be rotatable relative to the PCB.

According to an embodiment, the antenna element may be configured to be disposed on the same plane as the PCB. The first branch line including the first to fifth metal patterns may be disposed in parallel to the first axis of the PCB, so that the element operates with a first polarization.

According to an embodiment, the antenna element may be configured to be disposed on the same plane as the PCB. The first branch line including the first to fifth metal patterns may be disposed perpendicular to the first axis of the PCB, so that the element operates with a second polarization.

A vehicle having an antenna module may be provided. The vehicle may include: an antenna module disposed on a bottom of a roof of the vehicle or on glass of the vehicle; and a processor disposed inside or outside the antenna module, and configured to communicate with at least one of an adjacent vehicle, a road side unit (RSU), and a base station. The antenna module may include: a printed circuit board (PCB) with transmission lines formed thereon; and an antenna element coupled to the PCB, and configured such that metal patterns on one surface thereof are interconnected in a first axial direction and a second axial direction perpendicular to the first axial direction.

According to an embodiment, the metal patterns may include: a first branch line configured such that metal patterns disposed in the first axial direction have an overlapped length on the second axis; and a second branch line extending from an end of the first branch line connected with the PCB to a portion parallel to the PCB, to be perpendicular to the PCB.

According to an embodiment, the first branch line may include first metal patterns disposed parallel to the second axis in a segmented form at a first point on the first axis, and second metal patterns disposed parallel to the first metal patterns in a segmented form at a second point on the first axis. The first branch line may further include: third metal patterns disposed parallel to the second metal patterns in a segmented form at a third point on the first axis; fourth metal patterns configured to connect the first metal patterns and the second metal patterns and disposed parallel to the first axis; and fifth metal patterns configured to connect the second metal patterns and the third metal patterns, and disposed parallel to the first axis.

According to an embodiment, the antenna element may operate as a radiator in a first band by current, which is formed in a first direction on the second axis in the first metal pattern and the third metal pattern constituting the first branch line. The antenna element may operate as a radiator in a second band higher than the first band by current, which is formed in the first direction by metal patterns, disposed in the second axial direction, among metal patterns constituting the second branch line. The antenna element may operate as a radiator in a third band higher than the second band by current, which is formed in the first direction by the metal patterns, disposed in the second axial direction, among the metal patterns constituting the first branch line and the second branch line.

According to an embodiment, the antenna module may include a first antenna and a second antenna each configured by the antenna element including the first branch line and the second branch line. The processor may perform multi-input/multi-output (MIMO) in the first band through first antenna and the second antenna. The processor may control the MIMO to be performed in the second band and the third band higher than the first band through the first antenna and the second antenna.

According to an embodiment, the first and second antennas may be coupled to the PCB so as to be rotatable relative to the PCB. The processor may rotate at least one of the first and second antennas to be disposed parallel to the PCB, and when both the first and second antennas are disposed parallel to the PCB, rotate one of the first and second antennas to be disposed perpendicular to the first axis of the PCB, such that first and second polarizations of the first and second antennas are orthogonal to each other.

Advantageous Effects of Invention

Hereinafter, technical effects of an antenna module mounted on a vehicle and the vehicle having the antenna module will be described.

According to the present disclosure, a wideband antenna can be implemented in a vehicle using metal patterns with a twisted structure.

According to the present disclosure, a wideband antenna can be implemented in a vehicle using metal patterns with a twisted structure, which is formed on an antenna PCB coupled to a PCB.

According to the present disclosure, a low-elevation beam pattern can be implemented through the twisted structure of vertical/horizontal branch lines.

According to the present disclosure, a wideband and high-efficiency antenna for vehicle can be implemented using metal patterns with a twisted structure, which is formed on an antenna PCB vertically coupled to a PCB.

According to the present disclosure, even when a MIMO antenna in an antenna module does not normally operate, communication can be performed through a backup antenna.

Further scope of applicability of the present disclosure will become apparent from the following detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

MODE FOR THE INVENTION

Figure 1A:
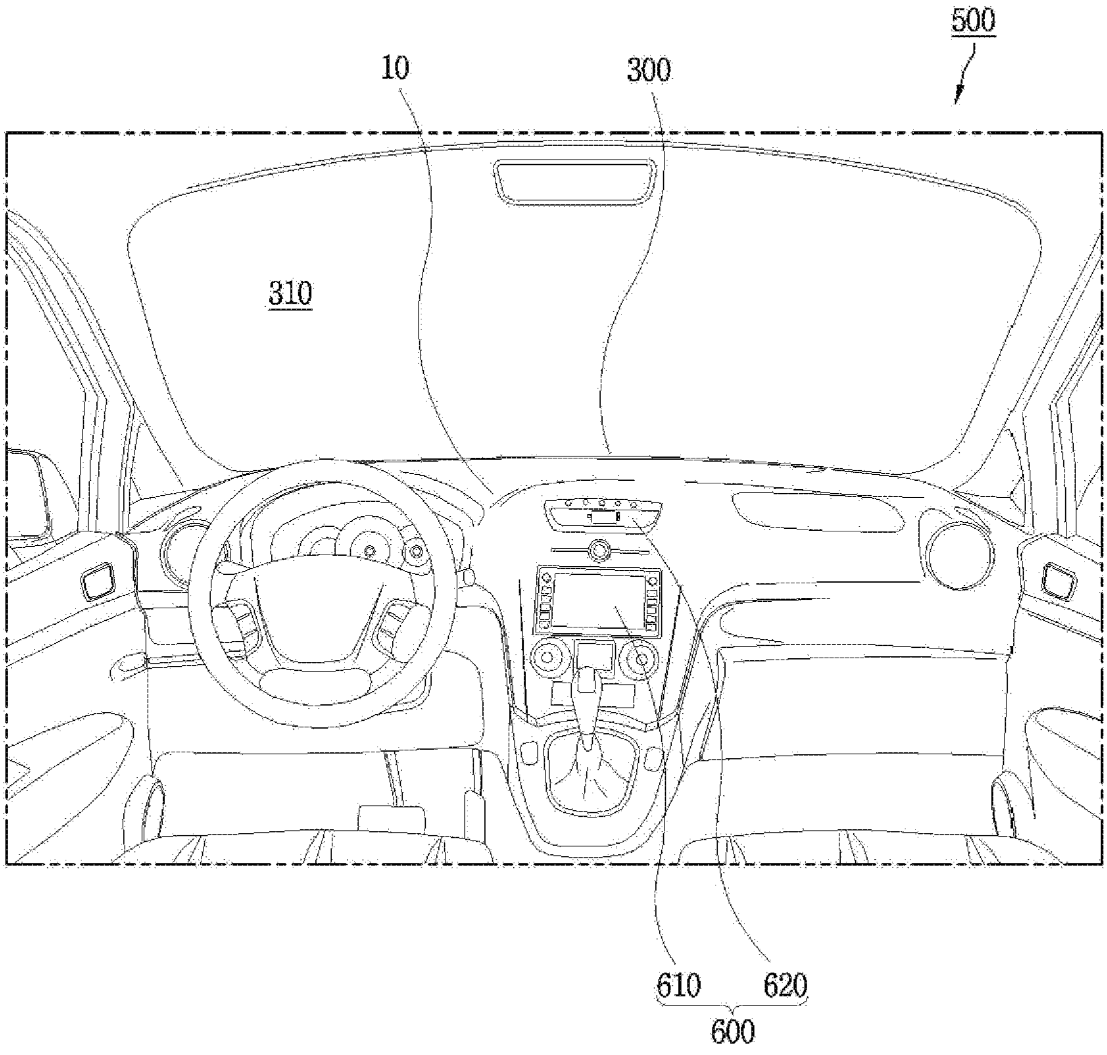
FIG. 1A is a diagram illustrating an internal configuration of a vehicle in accordance with one example.

Description will now be given in detail according to one or more embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

Description will now be given in detail according to one or more embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

An antenna system described herein may be mounted on a vehicle. Configurations and operations according to implementations may also be applied to a communication system, namely, antenna system mounted on a vehicle. In this regard, the antenna system mounted in the vehicle may include a plurality of antennas, and a transceiver circuit and a processor that control the plurality of antennas.

Figure 1B:
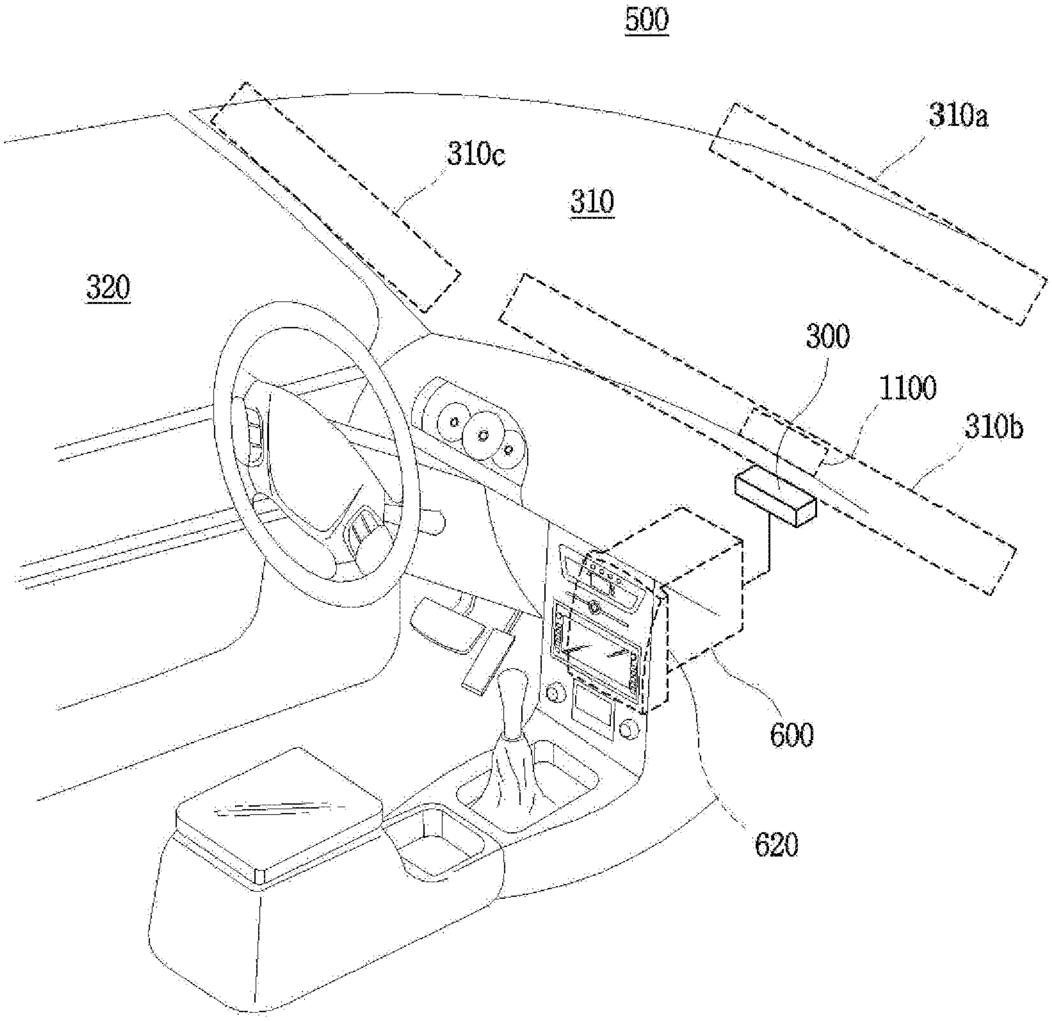
FIG. 1B is a lateral view illustrating the vehicle interior in accordance with the one example.

FIG. 1A is a diagram illustrating a vehicle interior in accordance with one example. FIG. 1B is a lateral view illustrating the vehicle interior in accordance with the one example.

As illustrated in FIGS. 1A and 1B, the present disclosure describes an antenna unit (i.e., an internal antenna system) 1000 capable of transmitting and receiving signals through GPS, 4G wireless communication, 5G wireless communication, Bluetooth, or wireless LAN. Therefore, the antenna unit (i.e., the antenna system) 1000 capable of supporting these various communication protocols may be referred to as an integrated antenna module 1000. The antenna system 1000 may include a telematics control unit (TCU) 300 and an antenna assembly 1100. For example, the antenna assembly 1100 may be disposed on a window of a vehicle.

The present disclosure also describes a vehicle 500 having the antenna system 1000. The vehicle 500 may include a dashboard and a housing 10 including the telematics control unit (TCU) 300, and the like. In addition, the vehicle 500 may include a mounting bracket for mounting the telematics control unit (TCU) 300.

The vehicle 500 may include the telematics control unit (TCU) 300 and an infotainment unit 600 configured to be connected to the telematics control unit 300. A portion of a front pattern of the infotainment unit 600 may be implemented in the form of a dashboard of the vehicle. A display 610 and an audio unit 620 may be included in the dashboard of the vehicle.

The antenna assembly 1100, namely, the antenna module 1100 in the form of a transparent antenna may be disposed at at least one of an upper region 310*a*, a lower region 310*b*, and a side region 310*c* of a front window 310. The antenna assembly 1100 may also be disposed at a side window 320, which is disposed at a side surface of the vehicle, in addition to the front window 310.

As illustrated in FIG. 1B, when the antenna assembly 1100 is disposed at the lower region 310*b* of the front window 310, it may be operably coupled to a TCU 300 disposed inside the vehicle. When the antenna assembly 1100 is disposed at the upper region 310*a* or the side region 310*c* of the front window 310, it may be operably coupled to a TCU disposed outside the vehicle. However, the present disclosure may not be limited to the TCU coupling configuration inside or outside the vehicle.

<V2X (Vehicle-to-Everything)>

V2X communication may include communications between a vehicle and all entities, such as V2V (Vehicle-to-Vehicle) which refers to communication between vehicles, V2I (Vehicle-to-Infrastructure) which refers to communication between a vehicle and an eNB or RSU (Road Side Unit), V2P (Vehicle-to-Pedestrian) which refers to communication between a vehicle and a terminal possessed by a person (pedestrian, cyclist, vehicle driver, or passenger), V2N (vehicle-to-network), and the like.

V2X communication may have the same meaning as V2X sidelink or NR V2X or may have, in a broader sense, a meaning including V2X sidelink or NR V2X.

V2X communication can be applied to various services, for example, forward collision warning, an automatic parking assist system, cooperative adaptive cruise control (CACC), control-loss warning, traffic queuing warning, safety warning, traffic vulnerable-area safety warning, emergency vehicle warning, curved-road driving speed warning, and traffic flow control.

V2X communication may be provided through a PC5 interface and/or a Uu interface. In this case, specific network entities for supporting communications between a vehicle and all entities may exist in a wireless communication system supporting V2X communication. For example, the network entity may include a base station (eNB), a Road Side Unit (RSU), a terminal, or an application server (e.g., a traffic safety server).

In addition, a terminal performing V2X communication may refer to not only a general handheld UE but also a vehicle (V-UE), a pedestrian UE, an RSU of an eNB type, an RSU of a UE type, a robot equipped with a communication module, and the like.

V2X communication may be performed directly between terminals or may be performed through the network entity (entities). V2X operation modes may be classified according to a method of performing such V2X communication.

Terms used in V2X communication may be defined as follows.

A Road Side Unit (RSU) is a V2X service enabled device that can transmit and receive data to and from a moving vehicle using V2I service. The RSU also serves as a stationary infrastructure entity that supports V2X application programs, and may exchange messages with other entities that support V2X application programs. The RSU is a term frequently used in existing ITS specifications, and the reason for introducing this term to the 3GPP specifications is to make the documents easier to read for the ITS industry. The RSU is a logical entity that combines a V2X application logic with the functionality of an eNB (referred to as an eNB-type RSU) or a UE (referred to as a UE-type RSU).

V2I Service is a type of V2X service, where one party is a vehicle whereas the other party is an entity belonging to infrastructure. A V2P Service is also a type of V2X service, where one party is a vehicle and the other party is a device carried by a person (e.g., a portable terminal carried by a pedestrian, a cyclist, a driver, or an occupant other than the driver). A V2X Service is a type of 3GPP communication service that involves a transmitting or receiving device on a vehicle. The V2X service may further be divided into a V2V service, a V2I service, and a V2P service according to which partner is involved in communication for the V2X service.

V2X enabled UE is a UE that supports V2X service. The V2V Service is a type of V2X service, where both parties involved in communication are vehicles. V2V communication range is a direct communication range between two vehicles involved in the V2V service.

Figure 2A:
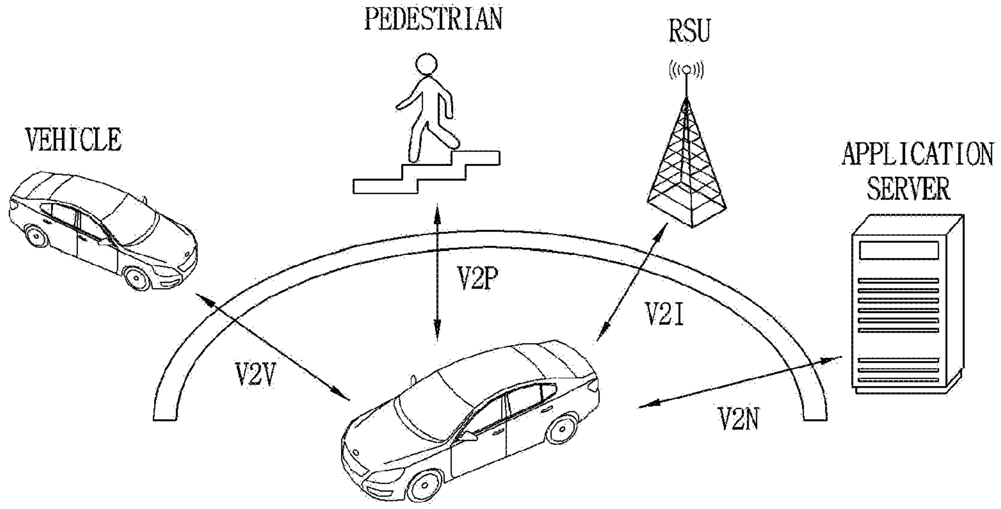
FIG. 2A illustrates types of V2X applications.

Four types of V2X applications called Vehicle-to-Everything (V2X), as described above, include (1) vehicle-to-vehicle (V2V), (2) vehicle-to-infrastructure (V2I), (3) vehicle-to-network (V2N), (4) vehicle-to-pedestrian (V2P). FIG. 2A illustrates types of V2X applications. Referring to FIG. 2A, the four types of V2X applications may use “cooperative awareness” to provide more intelligent services for end-users.

This means that, in order to provide more intelligent information, such as cooperative collision warning or autonomous traveling, entities, such as vehicles, roadside-based facilities, application servers and pedestrians, may collect knowledge of involved local environments (e.g., information received from nearby vehicles or sensor equipment) to process and share the corresponding knowledge.

<NR V2X>

In 3GPP Releases 14 and 15, support of the V2V and V2X services in LTE has been introduced in order to extend the 3GPP platform to the automotive industry.

Requirements for support of enhanced V2X use cases are largely organized into four use case groups.

(1) Vehicles Platooning enables the vehicles to dynamically form a platoon traveling together. All the vehicles in the platoon obtain information from the leading vehicle to manage this platoon. These information allow the vehicles to drive closer than normal in a coordinated manner, going to the same direction and traveling together.

(2) Extended Sensors enable the exchange of raw or processed data gathered through local sensors or live video images among vehicles, road site units, devices of pedestrians and V2X application servers. The vehicle can recognize an environment much more than through detection by its sensor and can recognize a local situation as a whole in a more extensive manner. A high data transmission rate is one of primarily features of the extended sensor.

(3) Advanced Driving enables semi-automated or full-automated driving. The advanced driving enables each vehicle and/or each RSU to share self-recognition data obtained from a local sensor with a nearby vehicle and to synchronize and adjust a trajectory or a maneuver. Each vehicle shares its intention to drive with a nearby vehicle.

(4) Remote driving serves to enable a remote driver or a V2X application program to drive a remotely-located vehicle in a dangerous environment by him/herself or itself or instead of an occupant who cannot drive the remotely-located vehicle. In a case where a traffic environment is limitedly changed and a vehicle driving path is predictable such as in public transportation, driving based on cloud computing may be available. High reliability and low latency are main requirements for the remote driving.

A description to be given below may be applicable to all of NR SL (sidelink) and LTE SL, and when no radio access technology (RAT) is indicated, the NR SL is meant. Six operational scenarios considered in NR V2X may be considered as follows. In this regard, FIG. 2B illustrates a standalone scenario supporting V2X SL communication and an MR-DC scenario supporting V2X SL communication.

In particular, 1) in Scenario 1, gNB provides control/configuration for UE’s V2X communication in both LTE SL and NR SL. 2) In Scenario 2, ng-eNB provides control/configuration for UE’s V2X communication in both LTE SL and NR SL. 3) In Scenario 3, eNB provides control/configuration for UE’s V2X communication in both LTE SL and NR SL. On the other hand, 4) in Scenario 4, the UE’s V2X communication in the LTE SL and the NR SL is controlled/configured by Uu while the UE is configured with EN-DC. 5) In Scenario 5, the UE’s V2X communication in the LTE SL and the NR SL is controlled/configured by Uu while the UE is configured in NE-DC. 6) In Scenario 6, the UE’s V2X communication in the LTE SL and the NR SL is controlled/configured by Uu while the UE is configured in NGEN-DC.

Figure 2B:
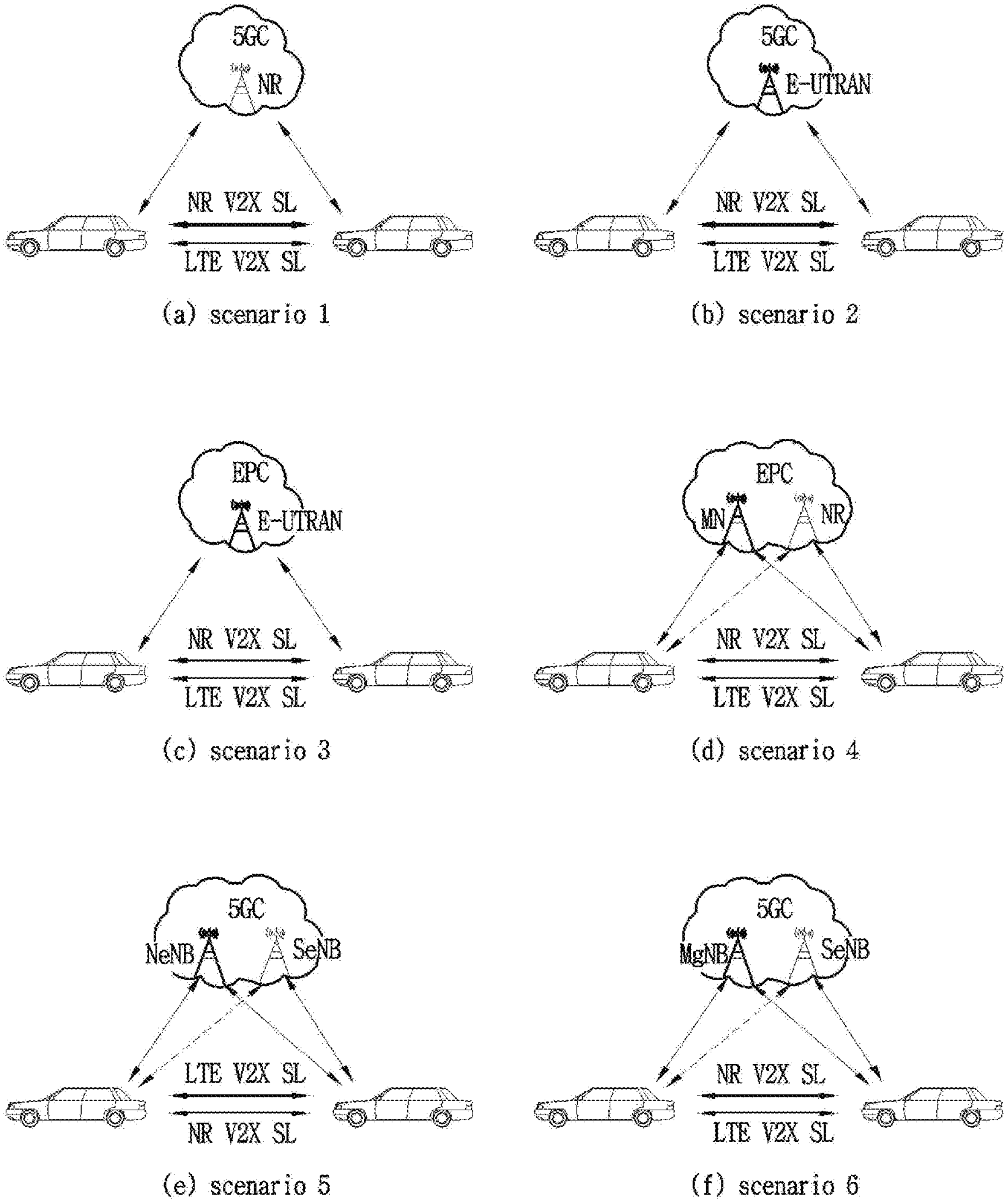
FIG. 2B illustrates a standalone scenario supporting V2X SL communication and an MR-DC scenario supporting V2X SL communication.

In order to support the V2X communication, as illustrated in FIGS. 2A and 2B, the vehicle may perform wireless communication with eNB and/or gNB through an antenna system. The antenna system may be configured as an internal antenna system as illustrated in FIGS. 1A and 1B. The antenna system may alternatively be implemented as an external antenna system and/or an internal antenna system as illustrated in FIGS. 3A to 3C.

Figure 3A:
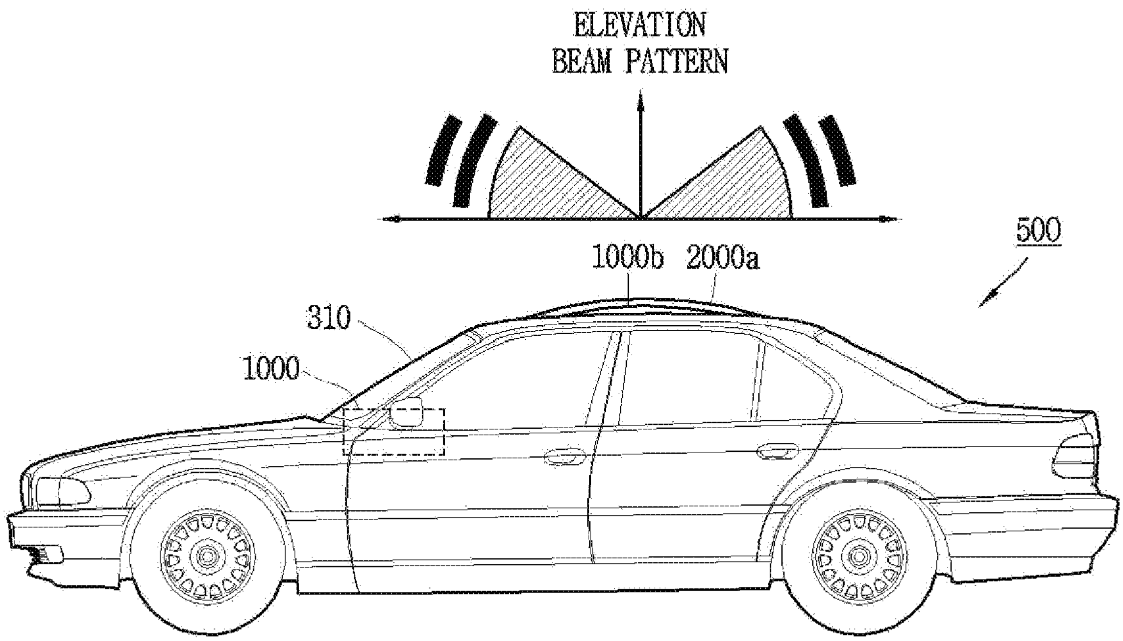
FIGS. 3A to 3C are views illustrating a structure for mounting an antenna system in a vehicle, to which the antenna system is mounted.
Figure 3B:
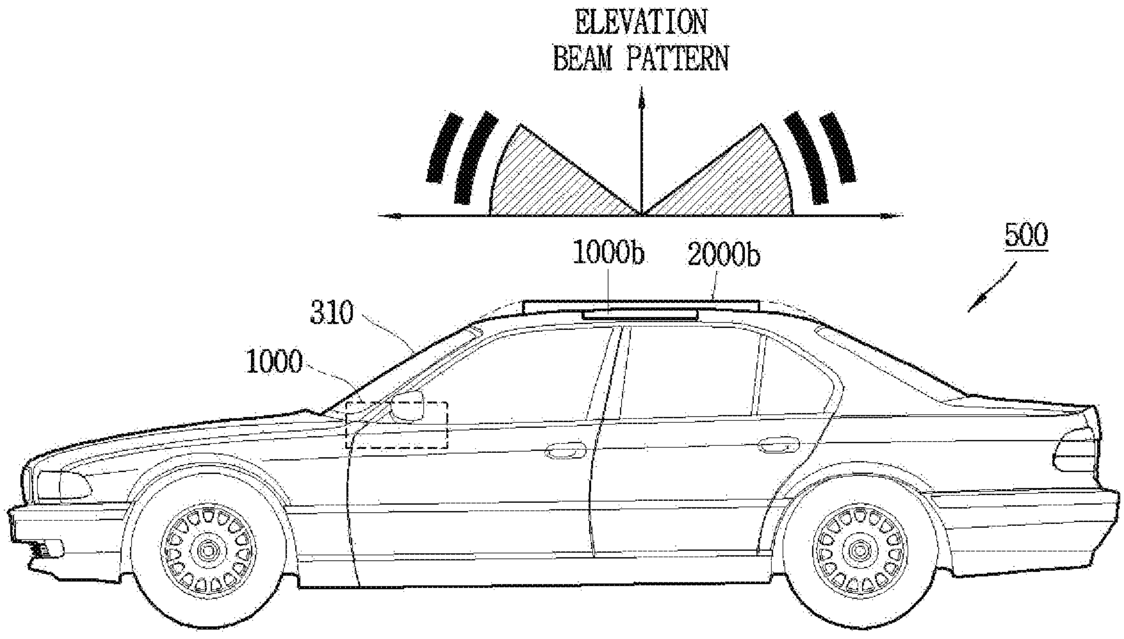
Figure 3C:
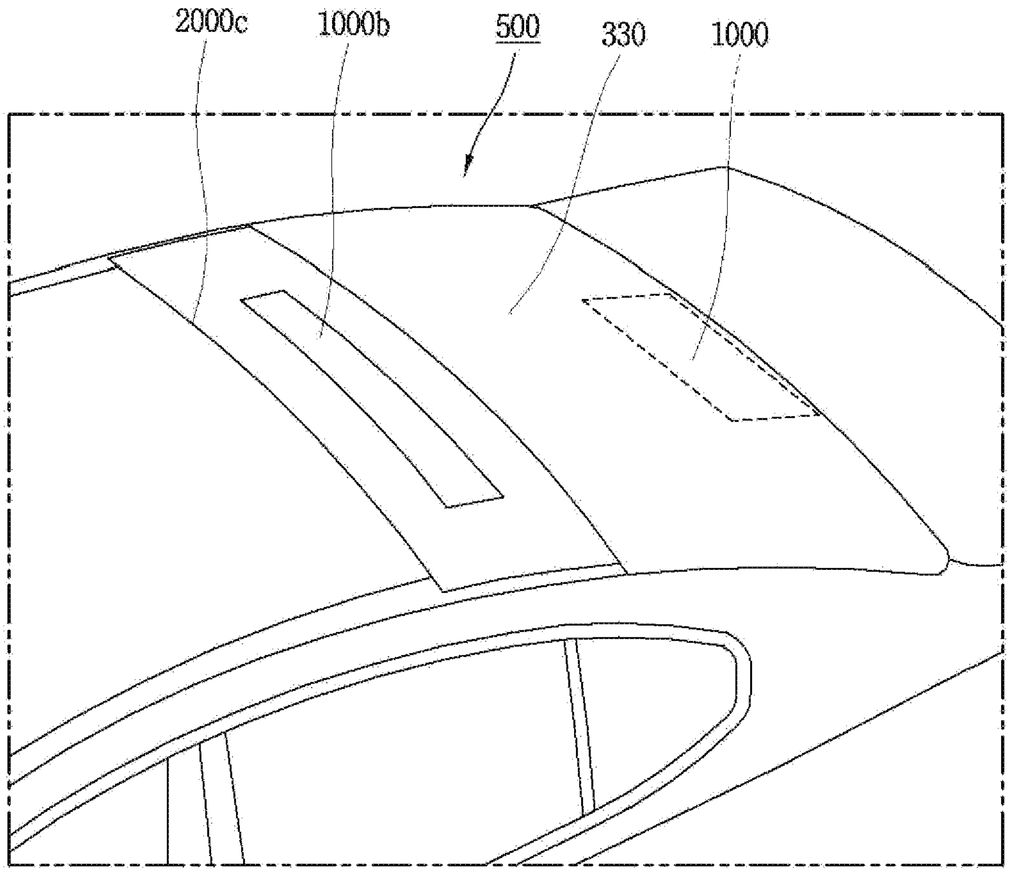

FIGS. 3A to 3C are views illustrating an example of a structure for mounting an antenna system on a vehicle, which includes the antenna system mounted on the vehicle. In this regard, FIGS. 3A to 3C illustrate a configuration capable of performing wireless communication through a transparent antenna disposed on the front window 310 of the vehicle. An antenna system 1000 including a transparent antenna may be disposed on a front window of a vehicle and inside the vehicle. Wireless communication may also be performed through a transparent antenna disposed on a side glass of the vehicle, in addition to the front window.

The antenna system for the vehicle that includes the transparent antenna can be combined with other antennas. Referring to FIGS. 3A to 3C, in addition to the antenna system 1000 implemented as the transparent antenna, a separate antenna system 1000*b* may be further configured. FIGS. 3A and 3B illustrate a structure in which the antenna system 1000*b*, in addition to the antenna system 1000, is mounted on or in a roof of the vehicle. On the other hand, FIG. 3C illustrates a structure in which the separate antenna system 1000*b*, in addition to the antenna system 1000, is mounted in a roof frame of a roof and a rear mirror of the vehicle.

Referring to FIGS. 3A to 3C, in order to improve the appearance of the vehicle and to maintain a telematics performance at the time of collision, an existing shark fin antenna may be replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 3A, the antenna system 1000 implemented as the transparent antenna may be disposed on the front window 310 of the vehicle and inside the vehicle. The second antenna system 1000*b* corresponding to an external antenna may be disposed on the roof of the vehicle. In FIG. 3A, a radome 2000*a* may cover the second antenna system 1000*b* to protect the second antenna system 1000*b* from an external environment and external impacts while the vehicle travels. The radome 2000*a* may be made of a dielectric material through which radio signals are transmitted/received between the second antenna system 1000*b* and a base station.

Referring to FIG. 3B, the antenna system 1000 implemented as the transparent antenna may be disposed on the front window 310 of the vehicle and inside the vehicle. One the other hand, the second antenna system 1000*b* corresponding to the external antenna may be disposed within a roof structure of the vehicle and at least part of the roof structure 2000*b* may be made of a non-metallic material. At this time, the roof structure 2000*b* of the vehicle except for the at least part made of the non-metallic material may be made of a dielectric material through which radio signals are transmitted/received between the antenna system 1000*b* and the base station.

Referring to FIG. 3C, the antenna system 1000 implemented as the transparent antenna may be disposed on the rear window 330 of the vehicle and inside the vehicle. The second antenna system 1000*b* corresponding to the external antenna may be disposed within the roof frame 2000*c* of the vehicle, and at least part of the roof frame 2000*c* may be made of a non-metallic material. At this time, the roof frame 2000*c* of the vehicle 500 except for the at least part made of the non-metallic material may be made of a dielectric material through which radio signals are transmitted/received between the second antenna system 1000*b* and the base station.

Referring to FIGS. 3A to 3C, antennas provided in the antenna system 1000 mounted on the vehicle may form a beam pattern in a direction perpendicular to the front window 310 or the rear window 330. Antenna provided in the second antenna system 1000 mounted on the vehicle may further define a beam coverage by a predetermined angle in a horizontal region with respect to the vehicle body.

Meanwhile, the vehicle 500 may include only the antenna unit (i.e., the internal antenna system) 1000 corresponding to the internal antenna without the antenna system 1000*b* corresponding to the external antenna.

Figure 4:
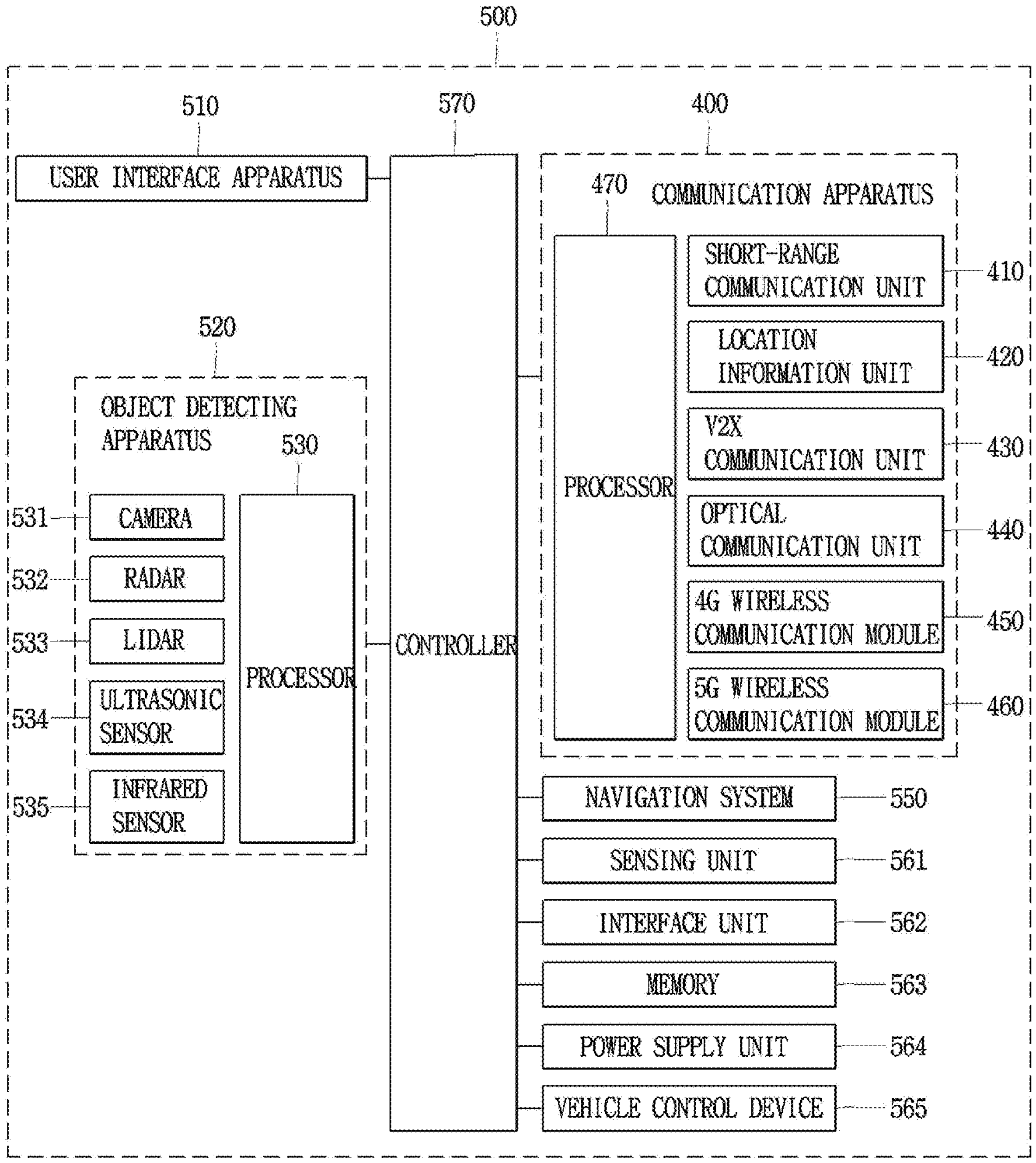
FIG. 4 is a block diagram illustrating a vehicle and an antenna system mounted to the vehicle in accordance with one example.

Meanwhile, FIG. 4 is a block diagram illustrating a vehicle and an antenna system mounted on the vehicle in accordance with an implementation.

The vehicle 500 may be an autonomous (driving) vehicle. The vehicle 500 may be switched into an autonomous driving mode or a manual mode (a pseudo driving mode) based on a user input. For example, the vehicle 500 may be switched from the manual mode into the autonomous mode or from the autonomous mode into the manual mode based on a user input received through a user interface device 510.

In relation to the manual mode and the autonomous driving mode, operations such as object detection, wireless communication, navigation, and operations of vehicle sensors and interfaces may be performed by the telematics control unit mounted on the vehicle 500. Specifically, the telematics control unit mounted on the vehicle 500 may perform the operations in cooperation with the antenna module 300, the object detecting apparatus 520, and other interfaces. In some examples, the communication apparatus 400 may be disposed in the telematics control unit separately from the antenna system 300 or may be disposed in the antenna system 300.

The vehicle 500 may be switched into the autonomous mode or the manual mode based on driving environment information. The driving environment information may be generated based on object information provided by the object detecting apparatus 520. For example, the vehicle 500 may be switched from the manual mode into the autonomous driving mode or from the autonomous driving mode into the manual mode based on driving environment information generated in the object detecting apparatus 520.

For example, the vehicle 500 may be switched from the manual mode into the autonomous driving mode or from the autonomous driving mode into the manual mode based on driving environment information received through the communication apparatus 400. The vehicle 500 may be switched from the manual mode into the autonomous driving mode or from the autonomous driving mode into the manual mode based on information, data or signal provided by an external device.

When the vehicle 500 travels in the autonomous mode, the autonomous vehicle 500 may travel under the control of an operation system. For example, the autonomous vehicle 500 may travel based on information, data or signal generated in a driving system, a parking exit (parking-lot leaving system, and a parking system. When the vehicle 500 is driven in the manual mode, the autonomous vehicle 500 may receive a user input for driving through a driving control apparatus. The vehicle 500 may travel based on the user input received through the driving control apparatus.

The vehicle 500 may include a user interface apparatus 510, an object detecting apparatus 520, a navigation system 550, and a communication apparatus 400. The vehicle may further include a sensing unit 561, an interface unit 562, a memory 563, a power supply unit 564, and a vehicle control device 565 in addition to the aforementioned apparatuses and devices. According to embodiments, the vehicle 500 may include more components in addition to components to be explained in this specification or may not include some of those components to be explained in this specification.

The user interface apparatus 510 may be an apparatus for communication between the vehicle 500 and a user. The user interface apparatus 510 may receive a user input and provide information generated in the vehicle 500 to the user. The vehicle 500 may implement user interfaces (UIs) or user experiences (UXs) through the user interface apparatus 200.

The object detecting apparatus 520 may be a device for detecting an object located at outside of the vehicle 500. The object may be a variety of things associated with driving (operation) of the vehicle 500. In some examples, objects may be classified into moving objects and fixed (stationary) objects. For example, the moving objects may include other vehicles and pedestrians. The fixed objects may conceptually include traffic signals, roads, and structures, for example. The object detecting apparatus 520 may include a camera 521, a radar 522, a LiDAR 523, an ultrasonic sensor 524, an infrared sensor 525, and a processor 530. In some implementations, the object detecting apparatus 520 may further include other components in addition to the components described, or may not include some of the components described.

The processor 530 may control an overall operation of each unit of the object detecting apparatus 520. The processor 530 may detect an object based on an acquired image, and track the object. The processor 530 may execute operations, such as computing of a distance to the object, computing of a relative speed with respect to the object and the like, through an image processing algorithm.

According to an embodiment, the object detecting apparatus 520 may include a plurality of processors 530 or may not include any processor 530. For example, each of the camera 521, the radar 522, the LiDAR 523, the ultrasonic sensor 524 and the infrared sensor 525 may include the processor in an individual manner.

When the processor 530 is not included in the object detecting apparatus 520, the object detecting apparatus 520 may operate according to the control of a processor of an apparatus within the vehicle 500 or the controller 570.

The navigation system 550 may provide location information related to the vehicle based on information obtained through the communication apparatus 400, in particular, a location information unit 420. Also, the navigation system 550 may provide a path (or route) guidance service to a destination based on current location information related to the vehicle. In addition, the navigation system 550 may provide guidance information related to surroundings of the vehicle based on information obtained through the object detecting apparatus 520 and/or a V2X communication unit 430. In some examples, guidance information, autonomous driving service, etc. may be provided based on V2V, V2I, and V2X information obtained through a wireless communication unit operating together with the antenna system 1000.

The communication apparatus 400 may be an apparatus for performing communication with an external device. Here, the external device may be another vehicle, a mobile terminal, or a server. The communication apparatus 400 may perform the communication by including at least one of a transmitting antenna, a receiving antenna, and radio frequency (RF) circuit and RF device for implementing various communication protocols. The communication apparatus 400 may include a short-range communication unit 410, a location information unit 420, a V2X communication unit 430, an optical communication unit 440, a 4G wireless communication module 450, and a processor 470. According to an embodiment, the communication apparatus 400 may further include other components in addition to the components described, or may not include some of the components described.

The short-range communication unit 410 is a unit for facilitating short-range communications. The short-range communication unit 410 may construct short-range wireless area networks to perform short-range communication between the vehicle 500 and at least one external device. The location information unit 420 may be a unit for acquiring location information related to the vehicle 500. For example, the location information unit 420 may include a Global Positioning System (GPS) module or a Differential Global Positioning System (DGPS) module.

The V2X communication unit 430 may be a unit for performing wireless communication with a server (Vehicle to Infrastructure; V2I), another vehicle (Vehicle to Vehicle; V2V), or a pedestrian (Vehicle to Pedestrian; V2P). The V2X communication unit 430 may include an RF circuit in which protocols for communication with an infrastructure (V2I), communication between vehicles (V2V), and communication with a pedestrian (V2P) are executable. The optical communication unit 440 may be a unit for performing communication with an external device through the medium of light. The optical communication unit 440 may include a light-emitting diode for converting an electric signal into an optical signal and sending the optical signal to the exterior, and a photodiode for converting the received optical signal into an electric signal. According to an embodiment, the optical transmission part may be formed integrally with lamps provided on the vehicle 500.

The wireless communication unit 460 is a unit that performs wireless communication with one or more communication systems through one or more antenna systems. The wireless communication unit 460 may transmit and/or receive a signal to and/or from a device in a first communication system through a first antenna system. In addition, the wireless communication unit may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

In some examples, the antenna module 300 disposed in the vehicle 500 may include a wireless communication unit. In this regard, the vehicle 500 may be an electric vehicle (EV) or a vehicle that can be connected to a communication system independently of an external electronic device. In this regard, the communication apparatus 400 may include at least one of the short-range communication unit 410, the location information unit 420, the V2X communication unit 430, the optical communication unit 440, a 4G wireless communication module 450, and a 5G wireless communication module 460.

The 4G wireless communication module 450 may perform transmission and reception of 4G signals with a 4G base station through a 4G mobile communication network. In this case, the 4G wireless communication module 450 may transmit at least one 4G transmission signal to the 4G base station. In addition, the 4G wireless communication module 450 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 460 may perform transmission and reception of 5G signals with a 5G base station through a 5G mobile communication network. Here, the 4G base station and the 5G base station may have a Non-Stand-Alone (NSA) architecture. The 4G base station and the 5G base station may be disposed in the Non-Stand-Alone (NSA) architecture. Alternatively, the 5G base station may be disposed in a Stand-Alone (SA) architecture at a separate location from the 4G base station. The 5G wireless communication module 460 may perform transmission and reception of 5G signals with a 5G base station through a 5G mobile communication network. In this case, the 5G wireless communication module 460 may transmit at least one 5G transmission signal to the 5G base station. In addition, the 5G wireless communication module 460 may receive at least one 5G reception signal from the 5G base station. In this instance, a 5G frequency band that is the same as a 4G frequency band may be used, and this may be referred to as LTE re-farming. In some examples, a Sub6 frequency band, which is a range of 6 GHz or less, may be used as the 5G frequency band. In contrast, a millimeter-wave (mmWave) band may be used as the 5G frequency band to perform wideband high-speed communication. When the mmWave band is used, the electronic device may perform beamforming for coverage expansion of an area where communication with a base station is possible.

Regardless of the 5G frequency band, in the 5G communication system, Multi-Input Multi-Output (MIMO) may be supported to be performed multiple times, in order to improve a transmission rate. In this instance, UL MIMO may be performed by a plurality of 5G transmission signals that are transmitted to a 5G base station. In addition, DL MIMO may be performed by a plurality of 5G reception signals that are received from the 5G base station.

In some examples, A state of dual connectivity (DC) to both the 4G base station and the 5G base station may be attained through the 4G wireless communication module 450 and the 5G wireless communication module 460. As such, the dual connectivity to the 4G base station and the 5G base station may be referred to as EUTRAN NR DC (EN-DC). When the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 450 and the 5G wireless communication module 460, respectively. Short-range communication between electronic devices (e.g., vehicles) may be performed between electronic devices (e.g., vehicles) using the 4G wireless communication module 450 and the 5G wireless communication module 460. In one embodiment, after resources are allocated, vehicles may perform wireless communication in a V2V manner without a base station.

Meanwhile, for transmission rate improvement and communication system convergence, Carrier Aggregation (CA) may be carried out using at least one of the 4G wireless communication module 450 and the 5G wireless communication module 460 and a WiFi communication module. In this regard, 4G+WiFi CA may be performed using the 4G wireless communication module 450 and the Wi-Fi communication module. Or, 5G+WiFi CA may be performed using the 5G wireless communication module 460 and the Wi-Fi communication module.

In some examples, the communication apparatus 400 may implement a display apparatus for a vehicle together with the user interface apparatus 510. In this instance, the display apparatus for the vehicle may be referred to as a telematics apparatus or an Audio Video Navigation (AVN) apparatus.

The processor 470 of the communication apparatus 400 may correspond to a modem. In this regard, the RFIC and the modem may be referred to as a first controller (or a first processor) and a second controller (a second processor), respectively. Meanwhile, the RFIC and the modem may be implemented as physically separate circuits. Alternatively, the RFIC and the modem may be logically or functionally separated from each other on one physical circuit. The modem may perform control and signal processing for signal transmission and reception through different communication systems using the RFID. The modem 1400 may acquire control information from a 4G base station and/or a 5G base station. Here, the control information may be received through a physical downlink control channel (PDCCH), but may not be limited thereto.

The modem may control the RFIC 1250 to transmit and/or receive signals through the first communication system and/or the second communication system for a specific time interval and from frequency resources. Accordingly, the vehicle can be allocated resources or maintain a connected state through the eNB or gNB. In addition, the vehicle may perform at least one of V2V communication, V2I communication, and V2P communication with other entities using the allocated resources.

Meanwhile, referring to FIGS. 1A to 4, the antenna module mounted on the vehicle may be disposed inside the vehicle, on the roof of the vehicle, inside the roof, or inside the roof frame. In this regard, the antenna system disclosed herein may be configured to operate in a low band (LB), mid band (MB), and high band (HB) of a 4G LTE system and a SUB6 band of a 5G NR system. Additionally, the antenna system disclosed herein may be configured to operate in a 2.4 GHz band, 5.5 GHz band, and 6.5 GHz band to provide Wi-Fi 6 and Wi-Fi 7 communication services.

Figure 5:
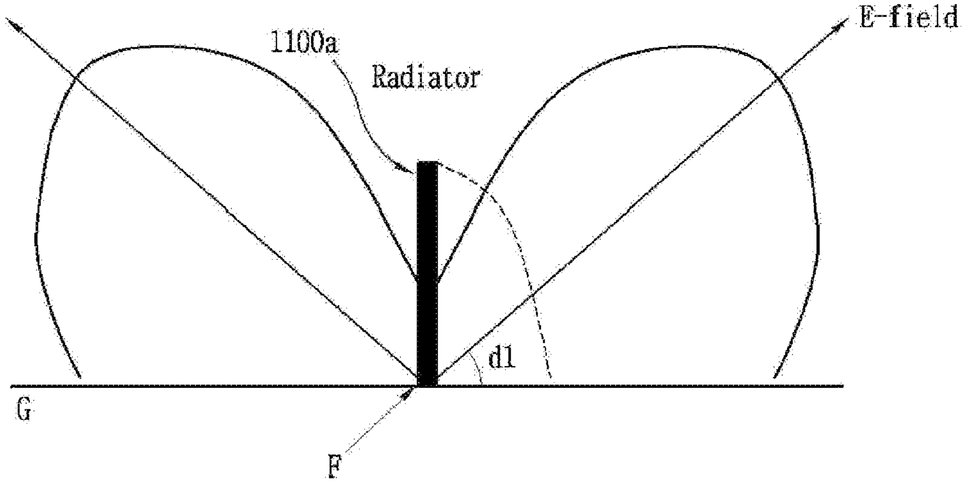
FIG. 5 illustrates diagrams in which radiation patterns depending on whether a ground is disposed on a rear side of an antenna element are compared when the antenna element is disposed perpendicular to a horizontal plane.
Figure 5:
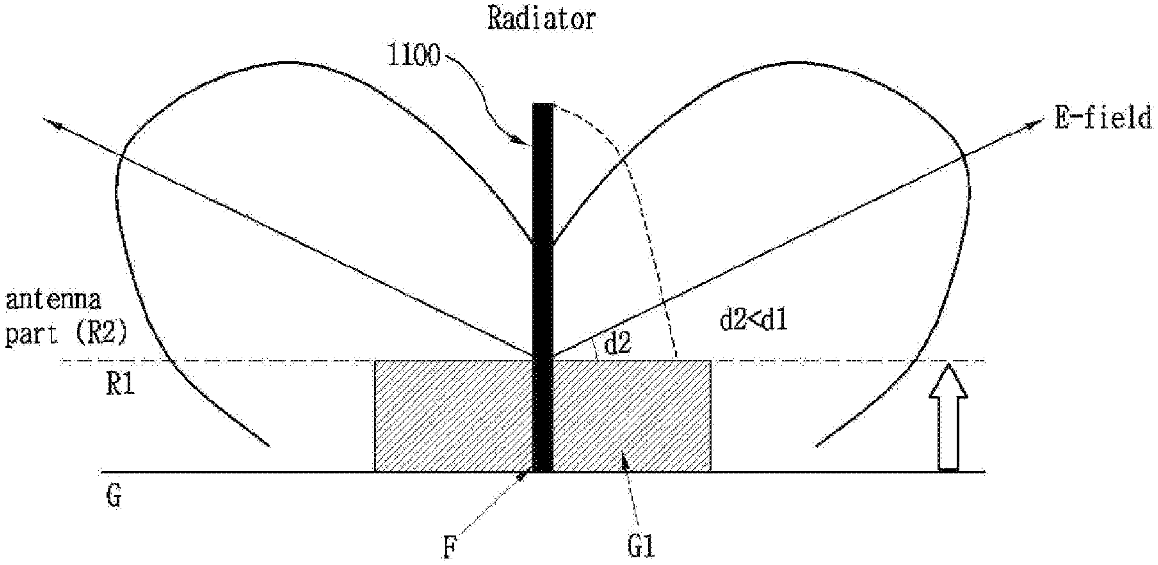

In this regard, FIG. 5 illustrates diagrams in which radiation patterns depending on whether a ground is disposed on a rear side of an antenna element are compared when the antenna element is disposed perpendicular to a horizontal plane. (a) of FIG. 5 shows a structure in which no ground is disposed on a rear side of the antenna element and a resultant radiation pattern. (b) of FIG. 5 shows a structure in which a ground is disposed on a rear side of the antenna element and a resultant radiation pattern.

Regarding the structures of (a) and (b) of FIG. 5, the ground G may be a ground disposed in a metal structure inside a roof 2000*a* to 2000*c* of the vehicle of FIGS. 3A to 3C. Referring to (a) of FIG. 5, an antenna element 1100*a* may be disposed between a roof 2000*a* to 2000*c* of the vehicle and a ground inside the roof. Accordingly, a radiation pattern by the antenna element 1100*a* is formed in a sky direction with respect to a horizontal plane. That is, a beam peak of the radiation pattern by the antenna element 1100*a* may be formed at an angle d1 with respect to the horizontal plane.

Referring to (b) of FIG. 5, a beam peak of the radiation pattern by the antenna element 1100 may be formed at an angle d2 with respect to the horizontal plane. The beam peak angle d2 by the antenna element 1100 in (b) of FIG. 5 is formed at an angle smaller than the beam peak angle d1 by the antenna element 1100*a* in (a) of FIG. 5.

In this regard, a ground G1 is disposed on a rear portion of the antenna element 1100. Therefore, a first region R1 consisting of the antenna pattern and the ground G1 disposed in a lower region of the antenna element 1100 constitutes a transmission line. Accordingly, an antenna part that substantially operates as a radiator is disposed in a second region R2, which is an upper region of the first region R1 constituting the transmission line. Therefore, a point where the ground in (b) of FIG. 5 is disposed is located higher than a point where the ground in (a) of FIG. 5 is disposed. Accordingly, the radiation pattern of the antenna element 1100 in (b) of FIG. 5 has a lower elevation radiation characteristic than the antenna element 1100*a* in (a) of FIG. 5.

Therefore, the antenna pattern corresponding to the radiator disposed in the antenna part is disposed in the second region R2, which is an upper region than a power feeder F disposed in the first region R1. Meanwhile, the ground G1 disposed on the rear portion of the antenna element 1100 may be connected to the ground G of the PCB 1200 disposed on a horizontal plane. In this regard, a width of a ground pattern constituting the ground G1 may be implemented to be above about twice or above three times a width of a conductive pattern on a front side on which the antenna element 1100 is disposed. The ground G1 may be frequency-selectively connected to the ground G of the PCB 1200 through a filter.

As described above, as the height of a point where the ground is disposed increases as shown in (b) of FIG. 5, a radiation pattern of the antenna element 1100 in (b) of FIG. 5 has a lower elevation radiation characteristic than that of the antenna element 1100*a* in (a) of FIG. 5. Meanwhile, a vehicle antenna module in which the antenna element 1100*a*, 1100 in (a) and (b) of FIG. 5 is disposed may perform a vehicle communication and control function, and may be referred to as a vehicle telemetric control unit (TCU). In this regard, it may be configured to connect the vehicle TCU and a separate shark fin antenna with a coaxial cable, but due to an increase in number of antennas and an increase in design requirements, but this specification proposes a structure in which antenna elements are disposed within a module.

A vehicle antenna requires a low-elevation radiation pattern. However, due to a location where the antenna is mounted on the vehicle and a structure of the TCU, there is a problem in that the radiation pattern is formed at a relatively high angle with respect to a horizontal plane, so that the beam peak to be directed toward the sky. Therefore, in order to implement a low-elevation radiation characteristic of a vehicle antenna, a height of the antenna must be structurally increased. Meanwhile, this specification proposes a structure of a wideband antenna element capable of implementing a low-elevation radiation characteristic while implementing a low profile structure that maintains an overall height of the antenna below a predetermined height.

Hereinafter, a wideband antenna provided in an antenna module that can be disposed in a vehicle according to this specification will be described. Meanwhile, the antenna presented herein may be implemented as a vehicle WiFi antenna to provide a WiFi communication service in a vehicle. In relation to the WiFi communication service, the vehicle WiFi antenna may operate in a 5 GHz band and a 6 GHz band in addition to a 2.4 GHz band to provide Wi-Fi 6 and Wi-Fi 7 communication services.

Wi-Fi 6 (IEEE 802.11ax; hereinafter referred to as 802.11ax) is a Wi-Fi standard designed by IEEE with a goal of providing the best Internet quality even in a public Wi-Fi environment through optimizing multiple access environments. Wi-Fi 6 may support speeds of up to 10 Gbps and achieve speeds of 1 Gbps with wider coverage and lower latency. Therefore, Wi-Fi 6 is also called high-efficiency wireless (HEW) by IEEE and the Wi-Fi Alliance. Meanwhile, Wi-Fi 6E, which is an extension standard of Wi-Fi 6, defines communication at 6 GHz, an unlicensed frequency, as the standard.

Wi-Fi 6 introduces new technologies such as OFDMA, improved MU-MIMO that can be used in both downlink and uplink, spatial frequency reuse, target wake time (TWT), and dynamic fragmentation. Support for up to 256-QAM in 802.11ac has been extended to 1024-QAM. The 802.11ac standard only supports a 5 GHz band, but Wi-Fi 6 may use 2.4 GHz in addition to 5 GHz.

Wi-Fi 7 is a next-generation Wi-Fi standard based on the IEEE 802.11be standard currently being studied by IEEE. Wi-Fi 7 is also called extremely high throughput (EHT). IEEE aims to achieve speeds of up to 30 Gbps in Wi-Fi 7. This is the same goal sought to be implemented in 5G mobile communication.

Wi-Fi 6 introduces technologies focused on maximizing efficiency in a multi-access environment. Meanwhile, Wi-Fi 7 aims to implement low latency (low delay time) and wide transmission speeds to prepare for the era of the 4th industrial revolution, like new radio (NR), which is the 5th generation mobile communication technology.

Figure 6A:
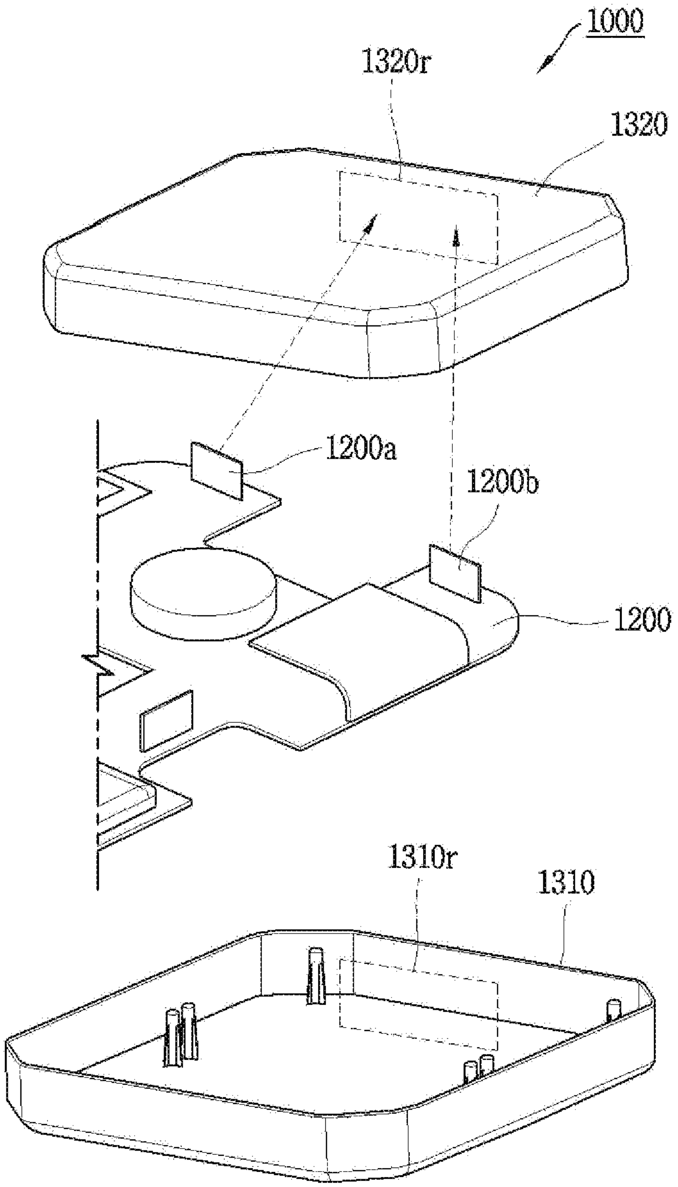
FIG. 6A is a configuration view of an antenna module, in which a PCB is coupled to an antenna PCB, according to the present disclosure.
Figure 6B:
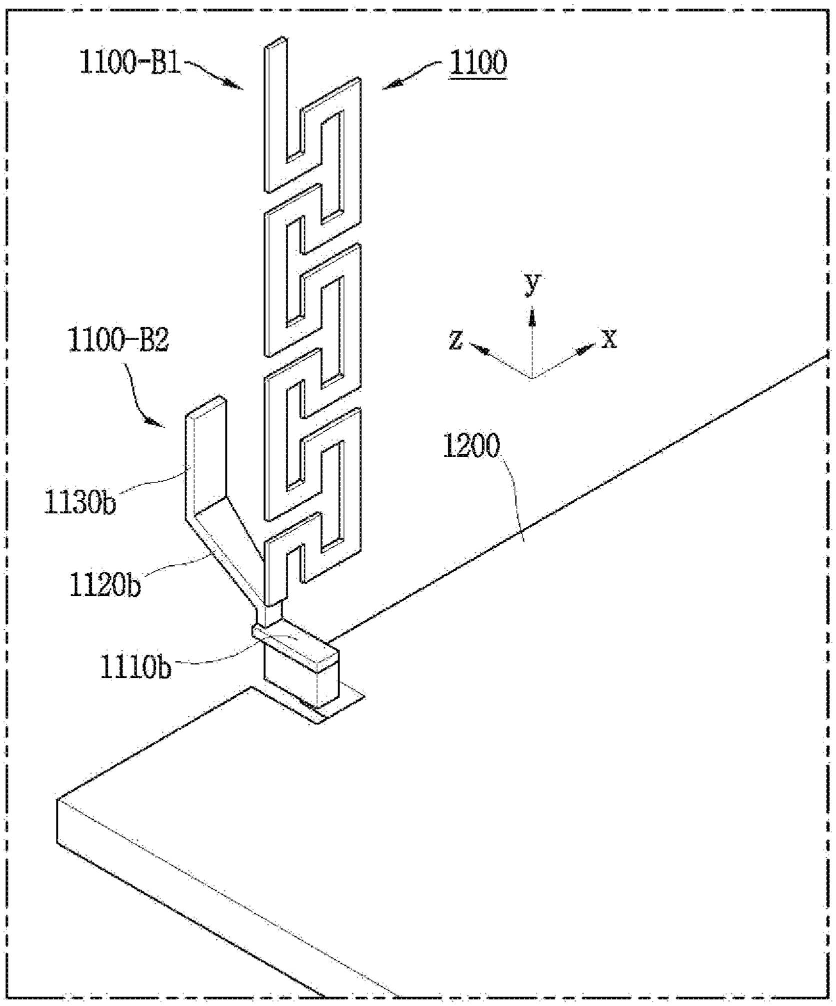
FIG. 6B is a perspective view illustrating that a wideband antenna element is coupled to a PCB, according to the present disclosure.

In order to provide such Wi-Fi 6 and Wi-Fi 7 communication services in a vehicle, hereinafter, a wideband antenna disposed in an antenna module that can be disposed on the vehicle according to the present disclosure will be described. In this regard, FIG. 6A is a configuration view of an antenna module, in which a PCB is coupled to an antenna PCB, according to the present disclosure. FIG. 6B is a perspective view illustrating that a wideband antenna element is coupled to a PCB, according to the present disclosure.

Figure 7A:
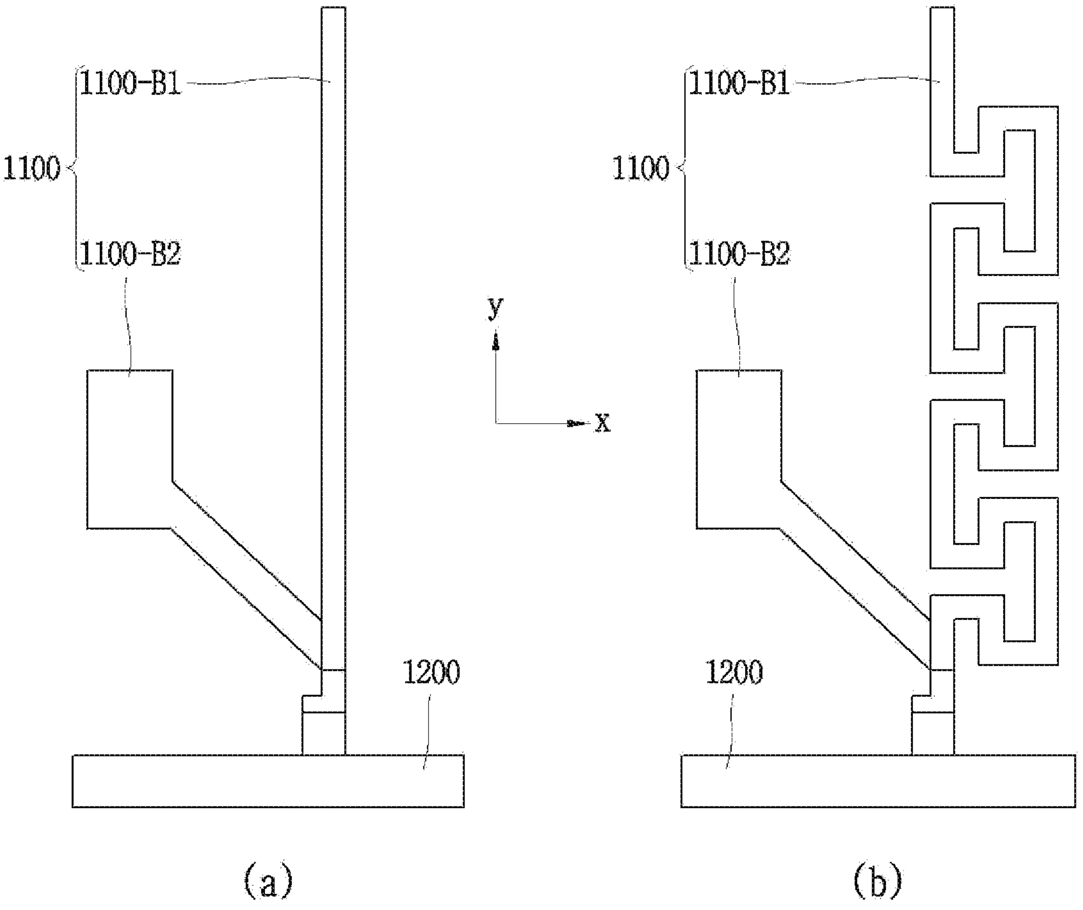
FIGS. 7A and 7B are conceptual diagrams illustrating an antenna element with a linear structure and an antenna element with a twisted structure in relation to the antenna structure of FIG. 6.
Figure 7B:
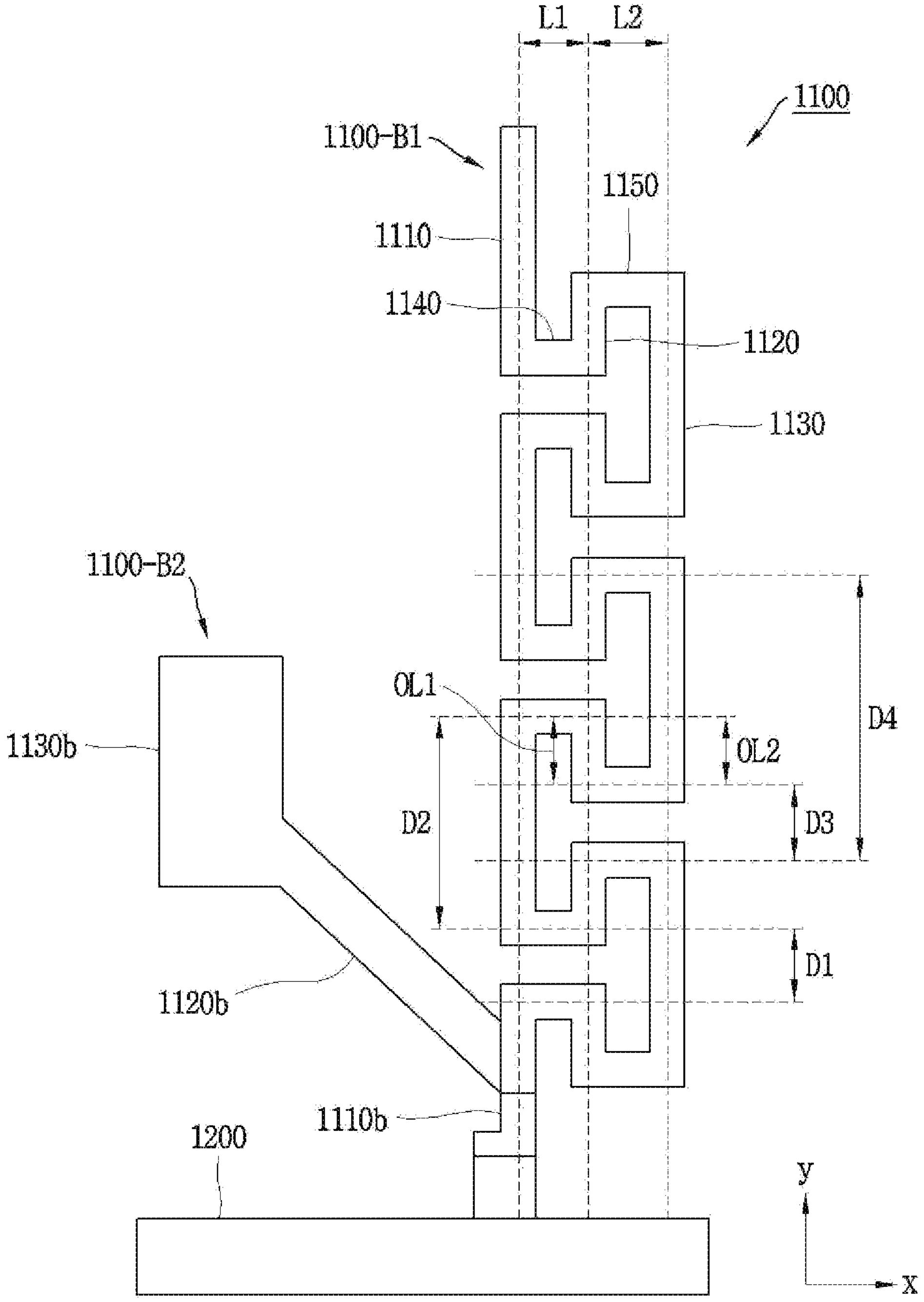

Also, FIGS. 7A and 7B are conceptual diagrams illustrating an antenna element with a linear structure and an antenna element with a twisted structure in relation to the antenna structure of FIG. 6.

Referring to FIGS. 6A to 7B, the antenna module 1000 mounted on the vehicle may include a PCB 1200 and an antenna element 1100. In this regard, the antenna element 1100 may be configured to be disposed on one surface of an antenna PCB 1200*a* of FIG. 6A. The antenna element 1100 may be disposed on a first antenna PCB 1200*a* and/or a second antenna PCB 1200*b* of FIG. 6A.

The wideband antenna element 1100 of the present disclosure may be formed in a twisted structure. The metal pattern of the wideband antenna element 1100 may be formed in a twisted structure to have an LC value. Meanwhile, the antenna structure according to the present disclosure may be formed in a vertical structure while being formed in a twisted structure to have a vertical current component.

The wideband antenna element 1100 according to the present disclosure is capable of performing self-impedance matching through a twisted metal pattern without a separate impedance matching circuit. Accordingly, the wideband antenna element 1100 according to the present disclosure may be referred to as a self-resonator. A self-resonator may cause an antenna resonance at a length longer than an original antenna length depending on an LC value, and main radiation locations may be concentrated in the upper region of the antenna. Therefore, the present disclosure is directed to improving the low-elevation characteristics of the self-resonator structure even slightly.

The antenna module 1000 may include a bottom cover 1310 and a top cover 1320. The bottom cover 1310 may be configured to accommodate the PCB 1200 therein, and to be attached or coupled to a vehicle. The lower cover 1310 may be configured to be attached to the upper or lower region of the roof of the vehicle in FIGS. 3A to 3C. The top cover 1320 may be configured to be coupled to the bottom cover 1310. As the bottom cover 1310 and the top cover 1320 are coupled to each other, the PCB 1200, the first antenna PCB 1200*a*, and/or the second antenna PCB 1200*b* may be disposed in an internal space.

Meanwhile, the wideband antenna element according to the present disclosure may be implemented on the rib structure of the top cover 1320. Referring to FIGS. 6A, 6B, and 7B, the antenna PCBs 1210*a* and 1210*b* may be implemented as rib structures 1310*r* and 1320*r* of the lower cover 1310 or the upper cover 1320 of the antenna module 1000, or may be attached to the rib structures 1310*r* and 1320*r*. The metal patterns of the antenna PCB 1210*a*, 1210*b* may be disposed on at least one surface of the rib structure 1310*r*, 1320*r*.

The PCB 1200 may have a transmission line, and transmit a wireless signal to the antenna element 1100 or the antenna element 1100 of the antenna PCB 1200*a* through the transmission line. The antenna PCB 1200*a* may be coupled to the PCB 1200, and may include the antenna element 1100 disposed on one surface such that metal patterns are interconnected in a first axial direction and a second axial direction perpendicular to the first axial direction. The transmission line of the PCB 1200 may have a microstrip line structure in which a ground pattern is formed on the rear surface and a signal line is disposed on the front surface. As another example, the transmission line of the PCB 1200 may be configured as a co-planar waveguide (CPW) structure in which a signal line is disposed on the front surface and a ground pattern is disposed on both sides or at least one side of the signal line at a predetermined spacing from the signal line. As another example, the transmission line of the PCB 1200 may be configured as a strip line structure in which ground patterns are disposed on both the upper and lower regions of the signal line.

Meanwhile, the antenna element 1100 of the twisted structure according to the present disclosure may be disposed on a dielectric substrate such as the antenna PCB 1200*a*, 1200*b* or may be disposed without an antenna PCB. Accordingly, the antenna element 1100 is not limited to the metal pattern disposed on the antenna PCB 1200*a*. As another example, the metal pattern may be a transparent metal pattern placed on the glass of a vehicle. As another example, the metal pattern may be configured as a metal rod or metal strip which is electrically connected to the PCB 1200 without a separate antenna PCB and is rotatable relative to the PCB 1200.

Figure 8A:
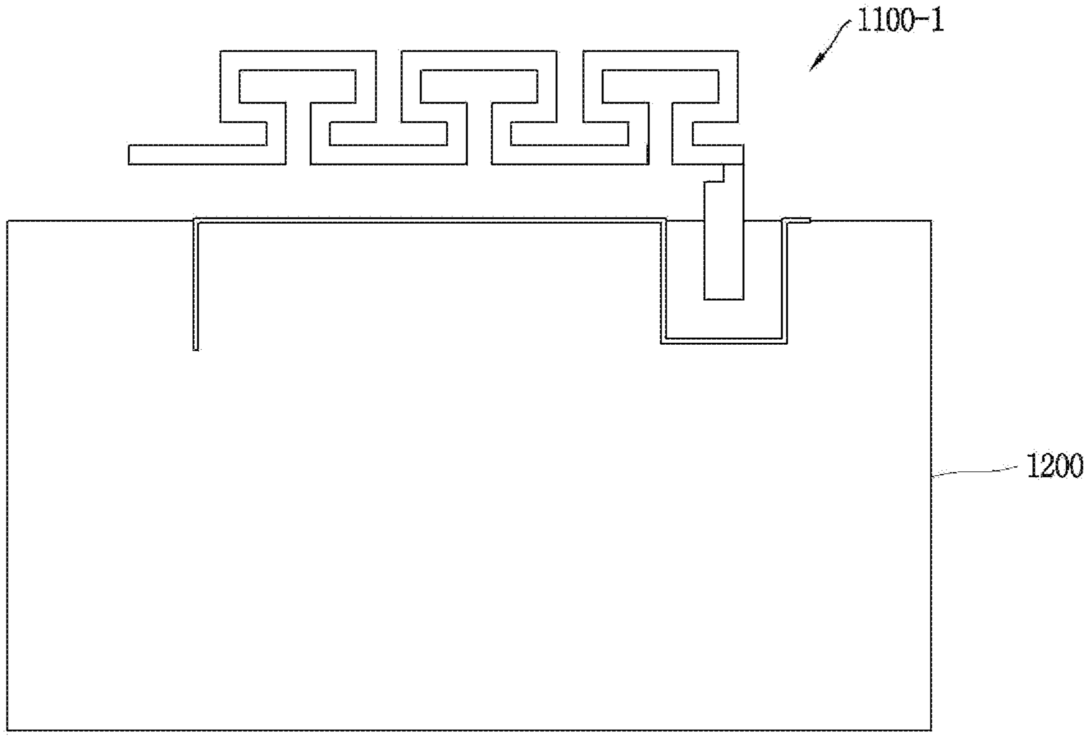
FIGS. 8A and 8B illustrate a structure in which a wideband antenna element formed in a twisted structure is rotatable relative to a PCB, according to various embodiments of the present disclosure.
Figure 8B:
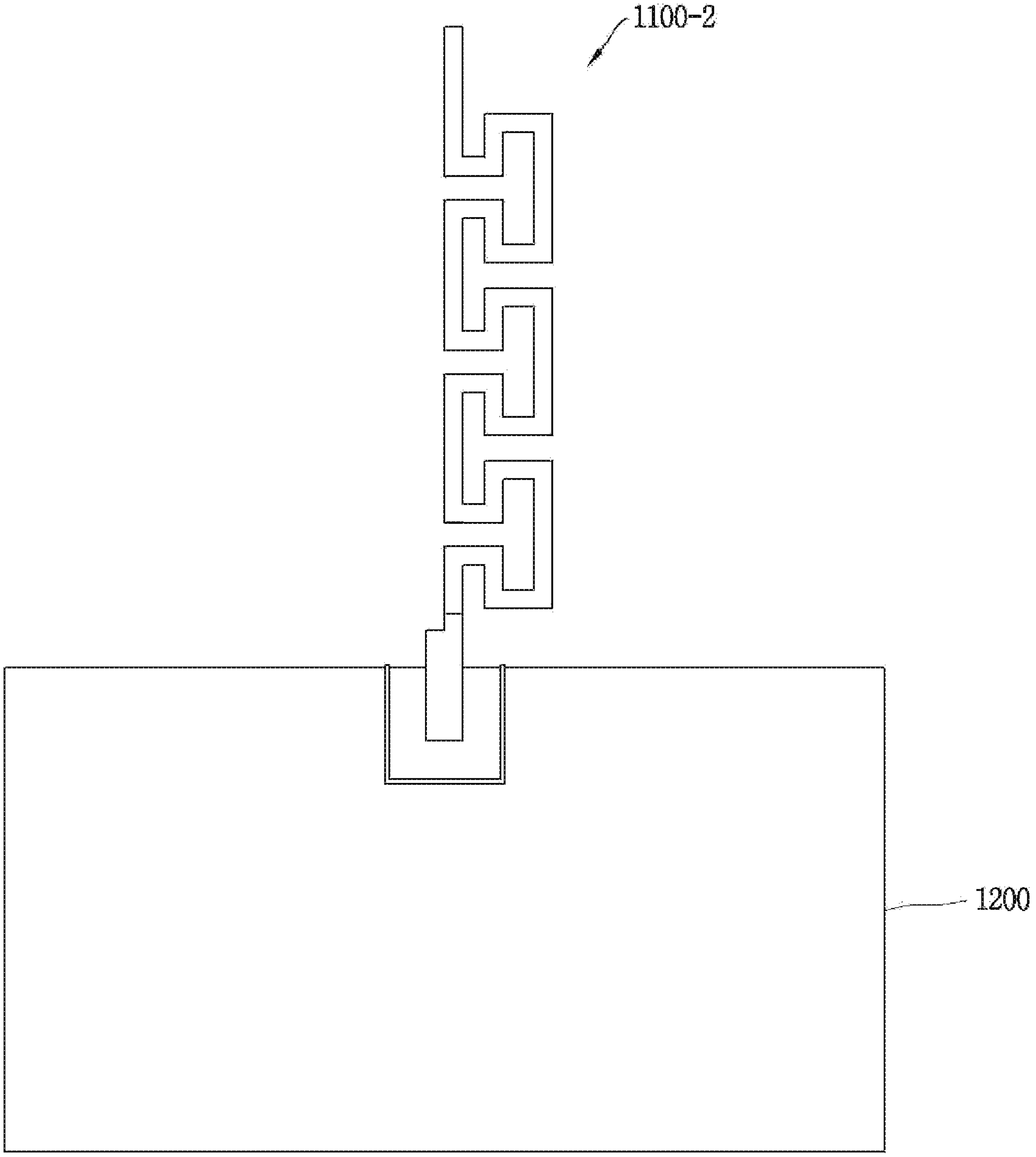

In this regard, FIGS. 8A and 8B illustrate a structure in which a wideband antenna element formed in a twisted structure is rotatable relative to a PCB, according to various embodiments of the present disclosure. Referring to FIG. 8A, the antenna element 1100 may be configured to be disposed on the same plane as the PCB.

Referring to FIGS. 6B and 8A, the antenna element 1100 may be coupled to the PCB 1200 to be rotatable relative to the PCB 1200. The antenna element 1100 may rotate with respect to the PCB 1200 by about 90 degrees from a second axis to a third axis and about 90 degrees from the third axis to a first axis. In this regard, the first, second, and third axes may be set to the x-axis, y-axis, and z-axis, respectively, as illustrated in FIG. 6.

Accordingly, an antenna element 1100-1 of FIG. 8A may be configured to be disposed on the same plane as the PCB 1200. Accordingly, the antenna element 1100-1 may operate as a horizontal polarization antenna whose polarization direction is set to a first polarization direction, for example, the x-axial direction.

Referring to FIGS. 6B and 8B, the antenna element 1100 may be coupled to the PCB 1200 to be rotatable relative to the PCB 1200. The antenna element 1100 may rotate about 90 degrees from the second axis to the third axis with respect to the PCB 1200. In this regard, the second and third axes may be set to the y-axis and z-axis, respectively, as illustrated in FIG. 6.

Accordingly, an antenna element 1100-2 of FIG. 8B may be configured to be disposed on the same plane as the PCB 1200. Accordingly, the antenna element 1100-2 may operate as a vertical polarization antenna whose polarization direction is set to a second polarization direction, for example, the y-axial direction. The antenna element 1100-1 of FIG. 8A and the antenna element 1100-2 of FIG. 8B may be disposed on the same plane as the main PCB 1200.

Hereinafter, an antenna module that may be disposed on a vehicle according to the present disclosure will be described with reference to FIGS. 6 to 8B. In this regard, the demand for WiFi 6/WiFi 7, which requires not only 2.4 GHz+5 GHz band but also 6-7 GHz band, is increasing recently. Due to the nature of installation on a vehicle, an antenna is designed and then assembled to the vehicle. As a result, the antenna which has been designed first is mounted in an environment with multiple ground structures, so the antenna encounters an environment where it is greatly affected by the ground. There is a need to design an antenna that satisfies WiFi 6/WiFi 7 and is insensitive to changes in surrounding ground environment. Therefore, the present disclosure is directed to proposing an antenna structure in which the metal pattern of an antenna element is formed in a structure with its own L and C values to be insensitive to the influence of surrounding environments.

Referring to FIGS. 7A and 7B, in a vehicle, an antenna may usually be implemented by using a PIFA structure or a monopole structure to support WiFi in the 2.4 GHz+5 GHz band. An antenna may be mainly installed inside a shark fin attached to the roof of a vehicle and connected to a TCU module through a coaxial cable, requiring isotropic radiation characteristics to the outside of the vehicle. In this regard, a monopole antenna element of FIG. 7A may have a length of ¼ of a wavelength and may generate resonance by using a phase difference of ¼ of the wavelength between an input signal entering the antenna and a reflected signal. Therefore, the monopole antenna element having a linear structure of FIG. 7A may be significantly affected by a surrounding ground.

On the other hand, in the wideband antenna element 1100 having the twisted structure of FIG. 7B, metal patterns may have their own L components and C components. Due to the influence of L and C values according to the L and C components of the metal patterns, antenna resonance may be generated at a height of the antenna element 1100 which is lower than ¼ wavelength. In this case, the resonance of the antenna element 1100 may be bound to the LC value of the metal pattern itself, and the influence of an adjacent ground may be reduced. In this regard, the operating band of the wideband antenna element 1100 with the twisted structure of FIG. 7B may include a V2X band in addition to a WiFi band.

Therefore, the wideband antenna element 1100 with the twisted-structure of FIG. 7B may be used to provide WiFi 6/WiFi 7 services and V2X communication services in addition to existing WiFi communication services.

Referring to FIGS. 6A to 8B, the antenna element 1100 may be configured such that metal patterns are interconnected on one surface thereof in a first axial direction and a second axial direction perpendicular to the first axial direction. In this regard, the first axis and the second axis may be set to the x-axis and the y-axis, respectively, as illustrated in FIG. 6. The metal patterns of the antenna element 1100 may include a plurality of metal patterns interconnected in a twist structure.

The metal patterns of the antenna element 1100 may include a first branch line 1100-B1 disposed on a first plane on the first and second axes. The metal patterns of the antenna element 1100 may include a second branch line 1100-B2 that is connected to the first branch line 1100-B1 and disposed on a second plane on the second axis and the third axis.

The first branch line 1100-B1 may be disposed such that metal patterns disposed in the first axial direction have an overlapped length on the second axis. The second branch line 1100-B2 may extend from the end of the first branch line 1100-B1 connected to the PCB 1200 to a portion parallel to the PCB 1200, to be perpendicular to the PCB 1200.

The first branch line 1100-B1 may include a plurality of metal patterns disposed on the first plane on the first axis and the second axis. The first branch line 1100-B1 may include a first metal pattern 1110 to a fifth metal pattern 1150. Each of the first to fifth metal patterns 1110 to 1150 may include a plurality of sub-metal patterns segmented on the first axis or the second axis.

The second branch line 1100-B2 may also include a plurality of metal patterns. The second branch line 1100-B1 may include a first metal pattern 1110*b*, a second metal pattern 1120*b*, and a third metal pattern 1130*b*.

The first metal pattern 1110*b* may be disposed parallel to the PCB 1200 and connected to the end of the first branch line 1100-B1. Another end of the first metal pattern 1110*b* may be configured to be substantially bent at 90 degrees in the second axial direction. The second metal pattern 1120*b* may be connected to the first metal pattern 1110*b* and may be inclined in the third axial direction at a predetermined angle. The third metal pattern 1130*b* may be connected to the end of the second metal pattern 1120*b*, and may be disposed to be parallel to and spaced apart from the metal patterns of the first branch line 1100-B1 in the z-axial direction. The third metal pattern 1130*b* may extend in the second axial direction. In this regard, the second axial direction and the third axial direction may be the y-axial direction and the z-axial direction, respectively.

Meanwhile, the first metal patterns 1110 may be disposed parallel to the second axis in a segmented form at a first point on the first axis. The second metal patterns 1120 may be disposed parallel to the second axis in a segmented form at a second point on the first axis. The second metal patterns 1120 may be disposed parallel to the first metal patterns 1110 in a segmented form at the second point on the first axis. The third metal patterns 1130 may be disposed parallel to the second axis in a segmented form at a third point on the first axis. The third metal patterns 1130 may be disposed parallel to the second metal patterns 1120 in a segmented form at the third point on the first axis.

The fourth metal patterns 1140 may be configured to connect the first metal patterns 1110 and the second metal patterns 1120. Each of the fourth metal patterns 1140 may be disposed parallel to the first axis in a segmented form. The fifth metal patterns 1150 may be configured to connect the second metal patterns 1120 and the third metal patterns 1130. Each of the fifth metal patterns 1150 may be disposed parallel to the first axis in a segmented form.

The first branch line 1100-B1 may be configured to have an overlapped length on the second axis, and the antenna element 1100 may form a low-elevation beam pattern by a current component in the vertical direction on the second axis. In this regard, the second metal patterns 1120 may be disposed to have overlapped lengths with the first metal patterns 1110 and the third metal patterns 1130 on the second axis. The antenna element 1100 may form a low-elevation beam pattern by the vertical current component on the second axis of the first to third metal patterns 1110 to 1130 having the overlapped lengths.

Meanwhile, the fourth metal patterns 1140 and the fifth metal patterns 1150 may be configured in a structure in which a metal pattern interval changes, for example, the metal patterns are adjacent to or spaced apart from each other. In this regard, a capacitive component may be formed between metal patterns in which currents are formed in different directions. On the other hand, an inductive component may be formed between metal patterns in which currents are formed in the same direction.

The fourth metal patterns 1140 which are disposed in parallel on the first axis may be alternately disposed on the second axis at a first spacing D1 and a second spacing D2 wider than the first spacing D1. On the other hand, the fifth metal patterns 1150 which are disposed in parallel on the first axis may be alternately disposed on the second axis at a third spacing D3 and a fourth spacing D4 wider than the third spacing D3.

In this way, the fourth metal patterns 1140 and the fifth metal patterns 1150 may alternately be disposed at narrow and wide spacings to form the periodic structure of the antenna element. By virtue of this periodic structure of the antenna element, the antenna element 1100 may operate as a wideband antenna. For example, the first spacing D1 of the fourth metal patterns 1140 may be set to be equal to the fourth spacing D4 of the fifth metal patterns 1150, so that the metal patterns with the twisted structure are parallel to each other. Furthermore, the second spacing D2 of the fourth metal patterns 1140 may be set to be equal to the third spacing D3 of the fifth metal patterns 1150, so that the metal patterns with the twisted structure are parallel to each other.

The capacitive component of the antenna element 1100 may be formed by the overlapped length between the first metal pattern 1110 and the second metal pattern 1120. The capacitive component of the antenna element 1100 may be formed by the overlapped length between the second metal pattern 1120 and the third metal pattern 1130.

In this regard, currents may be formed in opposite directions in the first metal pattern 1110 and the second metal pattern 1120 which are disposed to have a first spaced distance L1 on the first axis and a first overlapped length OL1 on the second axis. The currents formed in opposite directions in the first metal pattern 1110 and the second metal pattern 1120 may form a first capacitive component of the antenna element 1100. On the other hand, currents may be formed in opposite directions in the second metal pattern 1120 and the third metal pattern 1130 which are disposed to have a second spaced distance L2 on the first axis and a second overlapped length OL2 on the second axis. The currents formed in opposite directions in the second metal pattern 1120 and the third metal pattern 1130 may form a second capacitive component of the antenna element 1100.

In this way, each of the first to third metal patterns 1110 to 1150 may be configured in a segmented form on the second axis and adjacent on the first axis, thereby forming the periodic structure. By virtue of this periodic structure of the antenna element, the antenna element 1100 may operate as a wideband antenna. As described above, a capacitive component may be formed between metal patterns in which currents are formed in different directions. In particular, a capacitive component may be dominantly formed between the fourth metal patterns 1140 at the narrow first spacing D1 or the fifth metal patterns at the narrow fourth spacing D4.

In relation to this, currents may be formed in opposite directions on the first axis in the metal patterns, which are disposed at the first spacing D1 on the second axis, among the fourth metal patterns 1140. The fourth metal patterns 1140 disposed at the first spacing D1, in which currents are formed in the opposite directions on the first axis, may form a third capacitive component of the antenna element 1100. On the other hand, currents may be formed in opposite directions on the first axis in the metal patterns, which are disposed at the fourth spacing D4 on the second axis, among the fifth metal patterns 1140. The fifth metal patterns 1140 disposed at the fourth spacing D4, in which currents are formed in the opposite directions on the first axis, may form a fourth capacitive component of the antenna element 1100. As described above, the first spacing D1 of the fourth metal patterns 1140 may be set to be equal to the fourth spacing D4 of the fifth metal patterns 1150, so that the metal patterns with the twisted structure are parallel to each other. Furthermore, the second spacing D2 of the fourth metal patterns 1140 may be set to be equal to the third spacing D3 of the fifth metal patterns 1150, so that the metal patterns with the twisted structure are parallel to each other.

The antenna element 1100 with the twisted structure disclosed herein may operate as a wideband antenna by the combination of various LC components. In this regard, the antenna element 1100 may be configured to include a plurality of inductive components in addition to the first to fourth capacitive components described above.

The antenna element 1100 may include a first inductive component through a third inductive component. Those inductive components may be formed depending on the length of the metal patterns constituting the antenna element 1100. In particular, the inductive components of the antenna element 1100 may be formed by metal patterns, in which currents are formed in the same direction, among the metal patterns constituting the antenna element 1100.

The antenna element 1100 may form a first inductive component by an antenna length by the first metal pattern 1110 to the fifth metal pattern 1150. The antenna element 1100 may form a second inductive component by currents, which are formed in a first direction on the second axis in the first metal pattern 1110 and the third metal pattern 1130. The antenna element 1100 may form a third inductive component by current, which is formed in a second direction on the second axis in the second metal pattern 1120. Therefore, the antenna element 1110 may operate as a radiator in first to third bands by the combination of the first to third inductive components and the first to fourth capacitive components.

In this regard, the first band may be a WiFi band including 2.45 GHz. On the other hand, the second band may be set to a higher band than the first band. The second band may be a WiFi band including 5.5 GHz. The third band may be set to a higher band than the second band. The third band may be a WiFi band including 6.5 GHz.

Meanwhile, the antenna element 1100 may be configured to further include a fourth inductive component and a fifth inductive component in addition to the first to third inductive components described above.

The antenna element 1100 may form a fourth inductive component by a first combination of metal patterns, in which currents are formed equally in the first direction on the first axis, among the fourth metal patterns 1140. The antenna element 1100 may form a fourth inductive component by a second combination of metal patterns, in which currents are formed equally in the second direction on the first axis, among the fourth metal patterns 1140. The antenna element 1100 may form a fourth inductive component by the first combination and the second combination of the metal patterns, in which currents are formed equally in the first direction and the second direction on the first axis, among the fourth metal patterns 1140.

The antenna element 1100 may form a fifth inductive component by a first combination of metal patterns, in which currents are formed equally in the first direction on the first axis, among the fifth metal patterns 1150. The antenna element 1100 may form a fifth inductive component by a second combination of metal patterns, in which currents are formed equally in the second direction on the first axis, among the fifth metal patterns 1150. The antenna element 1100 may form a fifth inductive component by the first combination and the second combination of the metal patterns, in which currents are formed equally in the first direction and the second direction on the first axis, among the fifth metal patterns 1150.

The antenna element 1110 may operate as a radiator in first to third bands by the combination of the first to fifth inductive components and the first to fourth capacitive components. As described above, the first band may be a WiFi band including 2.45 GHz. On the other hand, the second band may be set to a higher band than the first band. The second band may be a WiFi band including 5.5 GHz. The third band may be set to a higher band than the second band. The third band may be a WiFi band including 6.5 GHz.

Figure 9A:
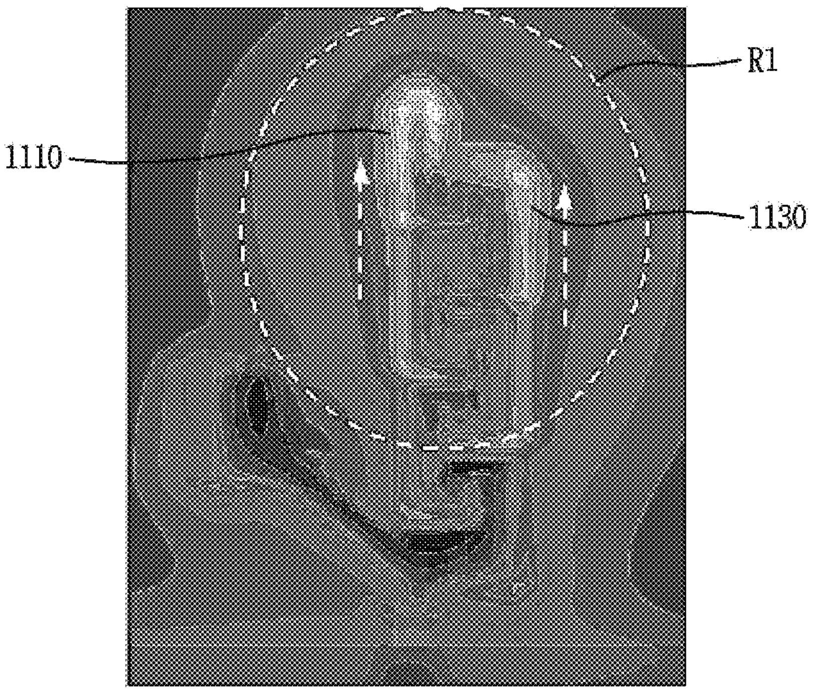
FIGS. 9A and 9B illustrate the electric field distribution and radiation pattern of an antenna element in a first band.
Figure 9B:
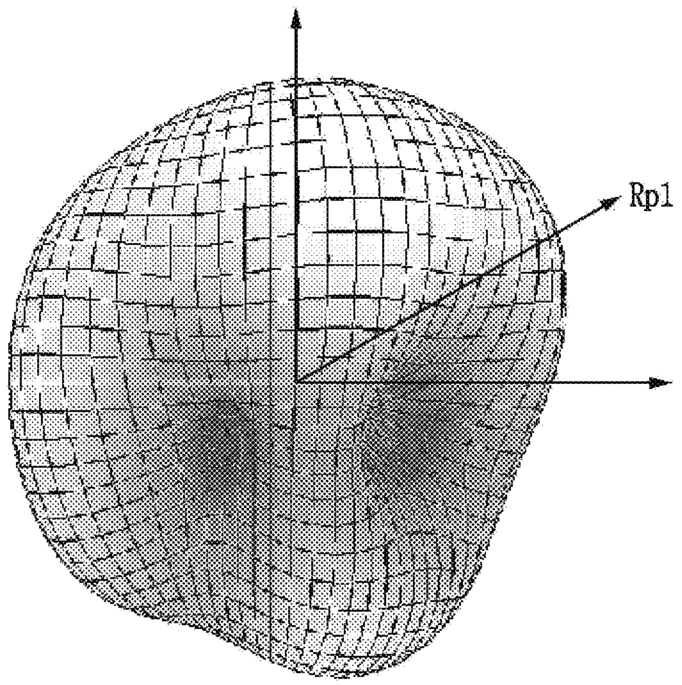
Figure 10A:
FIGS. 10A and 10B illustrate the electric field distribution and radiation pattern of the antenna element in a second band.
Figure 10B:
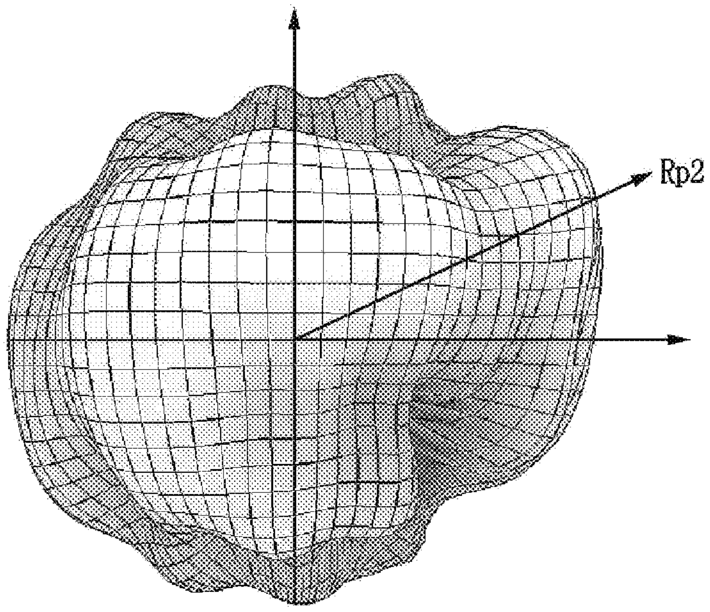
Figure 11A:
FIGS. 11A and 11B illustrate the electric field distribution and radiation pattern of the antenna element in a third band.
Figure 11B:
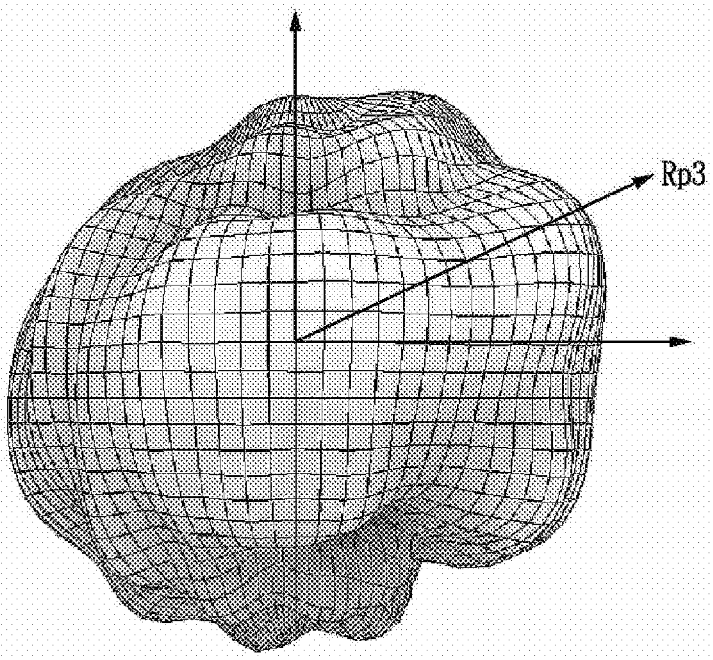

The antenna element having the periodic structure of the metal patterns disclosed herein may operate as a wideband antenna by forming a different electric field distribution for each frequency band. In this regard, FIGS. 9A and 9B illustrate the electric field distribution and radiation pattern of an antenna element in a first band. FIGS. 10A and 10B illustrate the electric field distribution and radiation pattern of the antenna element in a second band. Furthermore, FIGS. 11A and 11B illustrate the electric field distribution and radiation pattern of the antenna element in a third band.

A monopole type antenna with a length of ¼ wavelength may exhibit strong current distribution throughout a resonance region. On the other hand, the antenna element with the twisted structure disclosed herein may exhibit high electric field distribution in a first region R1, which corresponds to an upper region, as illustrated in FIG. 9A, by such various types of inductive components and capacitive components. In other words, the electric field distribution in the first region R1 corresponding to the upper region may create stronger current distribution than that in the lower region.

Referring to (b) of FIG. 5, FIGS. 6 to 8B, and FIG. 9A, when the electric field distribution is concentrated on the upper region of the antenna element 1100, changes in antenna performance become insensitive to the surrounding environment of the lower region. Accordingly, in the antenna element 1100 with the twisted structure according to the present disclosure, the electric field distribution may be concentrated on the first region R1 corresponding to the upper region due to the capacitive components and inductive components formed by the antenna element itself. Accordingly, the changes in antenna performance may become less sensitive to the surrounding environment of the vehicle corresponding to the lower region, that is, to a surrounding ground disposition structure. Additionally, the radiation pattern by the antenna element 1100 may form a low-elevation beam pattern in an elevation angle direction.

In this regard, FIG. 9B illustrates the radiation pattern of the antenna element in the first band. Referring to FIG. 9B, a null pattern may be formed at a low-elevation angle direction, and a low-elevation radiation pattern with a beam peak of Rp1 may be formed. The low-elevation radiation pattern may be defined as a radiation pattern in which the beam peak is formed at about 30 degrees or less relative to the horizontal plane, that is, the bottom surface of the PCB, but is not limited to this.

Referring to (b) of FIG. 5, FIGS. 6 to 8B, and FIG. 9A, the antenna element 1100 may form a low-elevation radiation pattern by vertical current in the first band. The antenna element 1100 may operate as a radiator in the first band by currents, which are formed in the first direction on the second axis of the first metal pattern 1110 and the third metal pattern 1130, which constitute the first branch line 1100-B1. Accordingly, the antenna element 1000 may operate as a radiator by the vertical current component in the first band. On the other hand, the antenna element 1100 may not directly contribute to the radiative components of the horizontal current component, but mainly contribute to impedance matching by forming capacitive components. Meanwhile, the antenna element 1100 may form a low-elevation radiation pattern in the first band by the vertical current of the first branch line 1100-B1, which corresponds to the upper region of the second branch line 1100-B2.

FIG. 10B illustrates the radiation pattern of the antenna element in the second band. Referring to FIG. 10B, a null pattern may be formed at a low-elevation angle direction, and a low-elevation radiation pattern with a beam peak of Rp2 may be formed. The low-elevation radiation pattern may be defined as a radiation pattern in which the beam peak is formed at about 30 degrees or less relative to the horizontal plane, that is, the bottom surface of the PCB, but is not limited to this.

Referring to (b) of FIG. 5, FIGS. 6 to 8B, and FIG. 10A, the antenna element 1100 may form a low-elevation radiation pattern by vertical current in the second band. The antenna element 1100 may operate as a radiator in the second band higher than the first band by a current, which is formed in the first direction by the metal patterns, disposed in the second axial direction, among the metal patterns constituting the second branch line 1100-B2. Accordingly, the antenna element 1000 may operate as a radiator by the vertical current component in the second band. On the other hand, the antenna element 1100 may not directly contribute to the radiative components of the horizontal current component, but mainly contribute to impedance matching by forming capacitive components. Meanwhile, the antenna element 1100 may form a low-elevation radiation pattern in the second band by the vertical current of the second branch line 1100-B2.

FIG. 11B illustrates the radiation pattern of the antenna element in the third band. Referring to FIG. 11B, a null pattern may be formed at a low-elevation angle direction, and a low-elevation radiation pattern with a beam peak of Rp3 may be formed. The low-elevation radiation pattern may be defined as a radiation pattern in which the beam peak is formed at about 30 degrees or less relative to the horizontal plane, that is, the bottom surface of the PCB, but is not limited to this.

Referring to (b) of FIG. 5, FIGS. 6 to 8B, and FIG. 11A, the antenna element 1100 may form a low-elevation radiation pattern by vertical current in the third band. The antenna element 1100 may operate as a radiator in the third band higher than the second band by a current, which is formed in the first direction by the metal patterns, disposed in the second axial direction, among the metal patterns constituting the first branch line 1100-B1 and the second branch line 1100-B2. Accordingly, the antenna element 1000 may operate as a radiator by the vertical current component in the third band. On the other hand, the antenna element 1100 may not directly contribute to the radiative components of the horizontal current component, but mainly contribute to impedance matching by forming capacitive components. Meanwhile, the antenna element 1100 may form a low-elevation radiation pattern in the third band by the vertical current of the first branch line 1100-B1 and the second branch line 1100-B2.

In summary, as illustrated in FIG. 9A, the electric field distribution in the first band including 2.45 GHz may mainly be formed in the upper region of the antenna, which may be advantageous for low-elevation radiation characteristics. Referring to FIG. 10A, the electric field distribution in the second band including 5.5 GHz may mainly be formed on the second branch line 1100-B2 corresponding to a high-band branch, thereby radiating a wireless signal through the high-band branch. Referring to FIG. 11A, the electric field distribution in the third band including 6.5 GHz may be formed on both the first branch line 1100B-1 and the second branch line 1100-B2.

Referring to FIGS. 9A, 10A, and 11A, the vertical component of the electric field, which is formed in the metal patterns in the full band of the first to third bands may exhibit much stronger characteristics than the horizontal component of the electric field. This can improve the low-elevation characteristics of the radiation pattern by the antenna element 1100 in the full band of the first to third bands. Therefore, the main characteristics of the antenna structure disclosed herein may form the vertical component of the electric field distribution, which is stronger than that in other structures, which may be appropriate to a structure which needs a specific radiation pattern. In this regard, when the antenna element 1100 is placed vertically with respect to the ground pattern of the PCB 1200 or the ground structure disposed parallel to the PCB 1200 as illustrated in FIG. 6, the low-elevation radiation pattern may be improved.

The antenna element 1100 disclosed herein may be configured with metal patterns formed in the twisted structure, as described above. Referring to FIGS. 6 to 8B, the first to fifth metal patterns 1110 to 1150 may operate as a radiator having twist-shaped metal patterns, in which currents are formed in opposite directions. Accordingly, the antenna element 1100 may operate as a radiator in the first to third bands and form the low-elevation radiation pattern while reducing the overall height thereof.

In this regard, the fourth metal patterns 1140 and the fifth metal patterns 1150 disposed in the second axial direction may form a periodic structure in which those metal patterns are alternately formed at a narrow spacing and a wide spacing. The fourth metal patterns 1140 may alternately have a first structure with a pair of adjacent metal patterns disposed at a first spacing D1 and a second structure with a pair of adjacent metal patterns disposed at a second spacing D2 larger than the first spacing D1 on the second axis.

Furthermore, the fifth metal patterns 1150 may alternately have the second structure with the pair of adjacent metal patterns disposed at the second spacing D2 and the first structure with the pair of adjacent metal patterns disposed at the first spacing D1 smaller than the second spacing D2 on the second axis.

This may configure a structure, in which the fourth metal patterns 1140 are disposed in parallel at the first spacing D1 and the second spacing D2, and a structure, in which the fifth metal patterns 1150 are disposed in parallel at the second spacing D2 and the first spacing D2. Through the structures, the first to fifth metal patterns 1110 to 1150 may operate as a radiator having twist-shaped metal patterns, in which currents are formed in opposite directions.

Hereinafter, a description will be given of first and second metal pattern pairs according to a current direction in the first to fifth metal patterns 1110 to 1150 of the antenna element 1100 with the twisted structure according to the present disclosure. In this regard, the first to fifth metal patterns 1110 to 1150 may configure a first metal pattern pair MP1 and a second metal pattern pair MP2.

The first metal pattern pair MP1 may be disposed in parallel in the first or second axial direction, and currents may be formed in the same direction. The second metal pattern pair MP2 may be disposed in parallel in the first or second axial direction, and currents may be formed in opposite directions. The first metal pattern pair MP1 may form an inductive component of the antenna element 1100, and the second metal pattern pair MP2 may form an inductive component of the antenna element 1100.

In this regard, the first metal patterns 1110, the second metal patterns 1120, and the third metal patterns 1130 may form currents equally in the second axial direction, thus, forming the first metal pattern pairs MP1. On the other hand, the first and second metal patterns 1110 and 1120, in which currents are formed in opposite directions, may form the second metal pattern pairs MP2. Furthermore, the second and third metal patterns 1120 and 1130 in which currents are formed in opposite directions may form the second metal pattern pairs MP2.

The antenna element 1100 with the twisted structure disclosed herein may be configured to provide various inductance and capacitance values to the metal patterns, and the proposed structure may be configured to radiate signals mainly by the vertical component of the electric field distribution formed in the metal patterns. Since the wideband operation can be made through the antenna element 1100 with the twisted structure without a separate impedance matching circuit, it may be referred to as a "self-resonator." In the self-resonator disclosed herein, antenna resonance may be caused by an LC value at a length longer than the length of the monopole antenna.

Therefore, the self-resonator structure can increase the length of the antenna itself. To solve this problem, in the present disclosure, the metal patterns may be formed in the twisted structure to reduce the entire length of the antenna itself and enable a wideband operation by currents formed in the same or different directions. Additionally, the antenna structure according to the present may have the characteristic that the main radiation is concentrated only on the upper region of the twisted structure. Therefore, the low-elevation radiation characteristics can be further improved as the main radiation is concentrated only on the upper region of the twisted structure.

On the other hand, in the antenna element with the linear structure as illustrated in FIG. 7A, radiation may be made from the first branch line, which is a long branch, in the first band (2.45 GHz). In this regard, the antenna element with the twisted structure may be configured to perform radiation in the first region R1 as the upper region, as illustrated in FIG. 9A, in the first band. On the other hand, the antenna element with the linear structure may be configured to perform radiation evenly in the lower region in addition to the first region (R1), which is the upper region, in the first band. Accordingly, the antenna element with the twisted structure may form a lower elevation radiation pattern than the antenna element with the linear structure.

Meanwhile, in the second band (5.5 GHz) and the third band (6.5 GHz), radiation may occur from the second branch line, which is a short branch. In this regard, in the antenna element having the linear structure, an electric field may be formed in the diagonal direction of the second branch line in the second and third bands. Accordingly, the radiation pattern of the antenna element with the linear structure may be biased in a specific direction in the second and third bands due to the electric field of the second branch line formed in the diagonal direction. On the other hand, in the antenna element with the twisted structure, the electric field may be formed in the vertical direction along the second branch line 1100-B2, as illustrated in FIGS. 10A and 10B. Accordingly, the antenna element with the twisted structure may form a lower elevation radiation pattern than the antenna element with the linear structure.

Meanwhile, the twisted wideband antenna structure disclosed herein may be disposed perpendicular to the PCB as illustrated in FIG. 6 or on the same plane as the PCB as illustrated in FIGS. 8A and 8B. Meanwhile, in the twisted wideband antenna structure, an antenna reflection coefficient characteristic, that is, voltage standing wave ratio (VSWR), may change depending on whether or not a second branch line is formed.

Figure 12A:
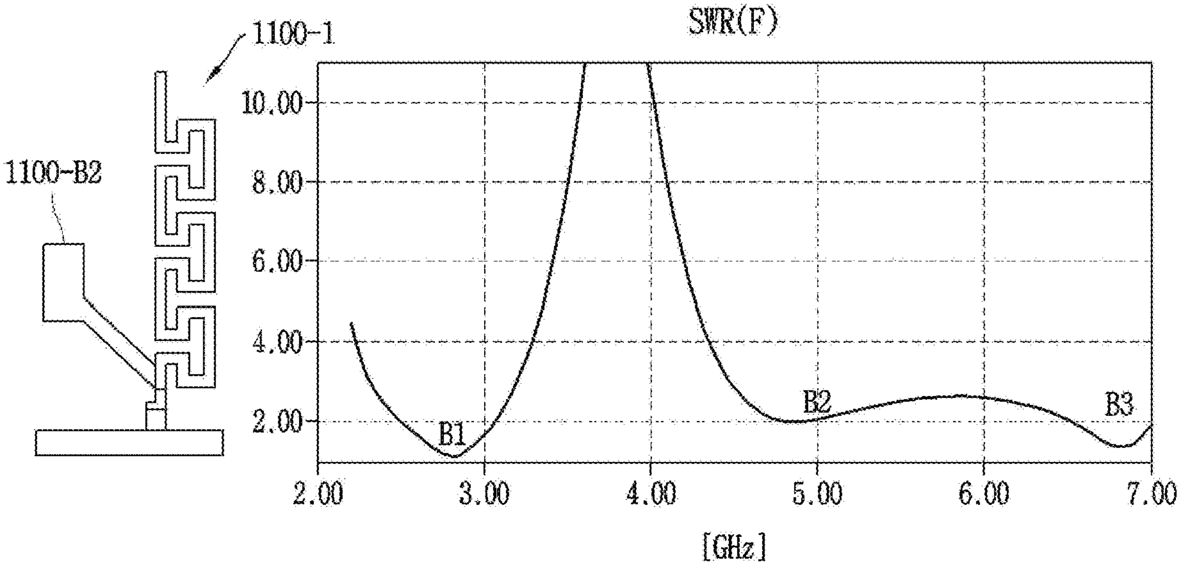
FIGS. 12A and 12B compare the VSWR results of a first structure with a second branch and a second structure without a second branch in a structure in which an antenna element is disposed perpendicular to the PCB.
Figure 12B:
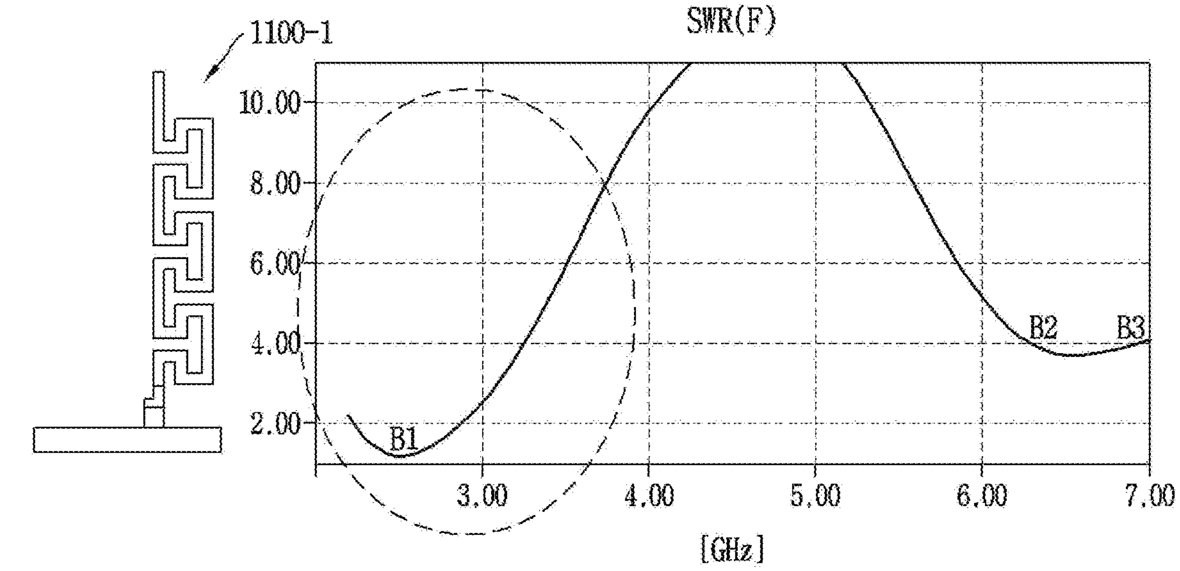
Figure 13A:
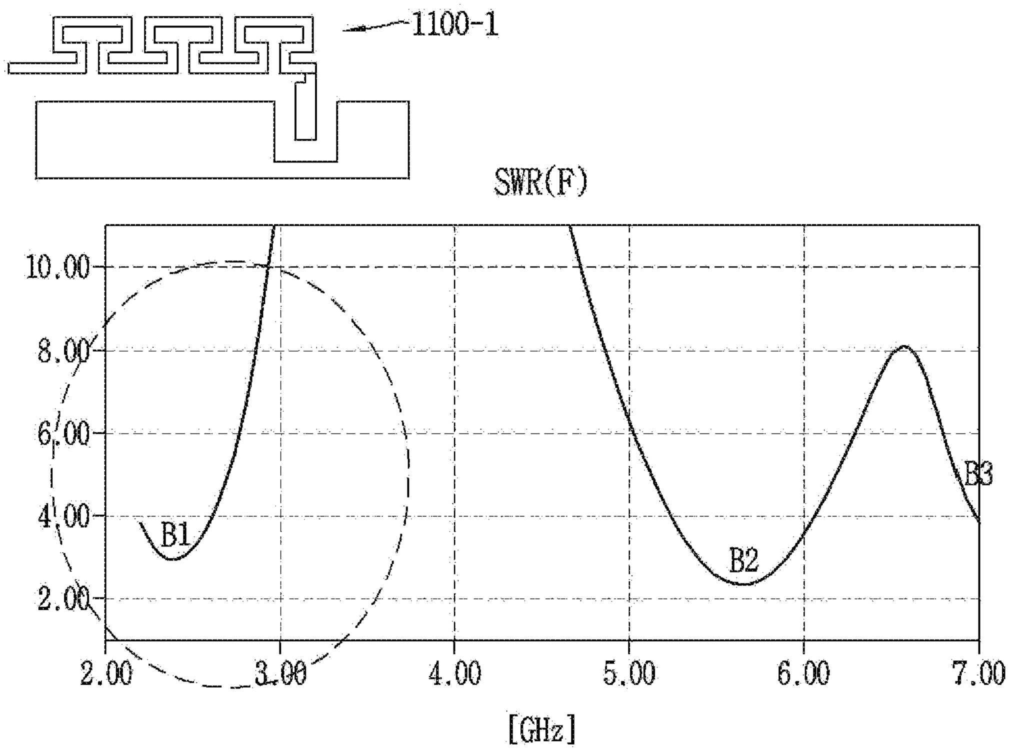
FIGS. 13A and 13B compare the VSWR results of a first structure and a second structure in which the metal patterns of an antenna element are disposed in first and second directions on the same plane as the PCB.
Figure 13B:
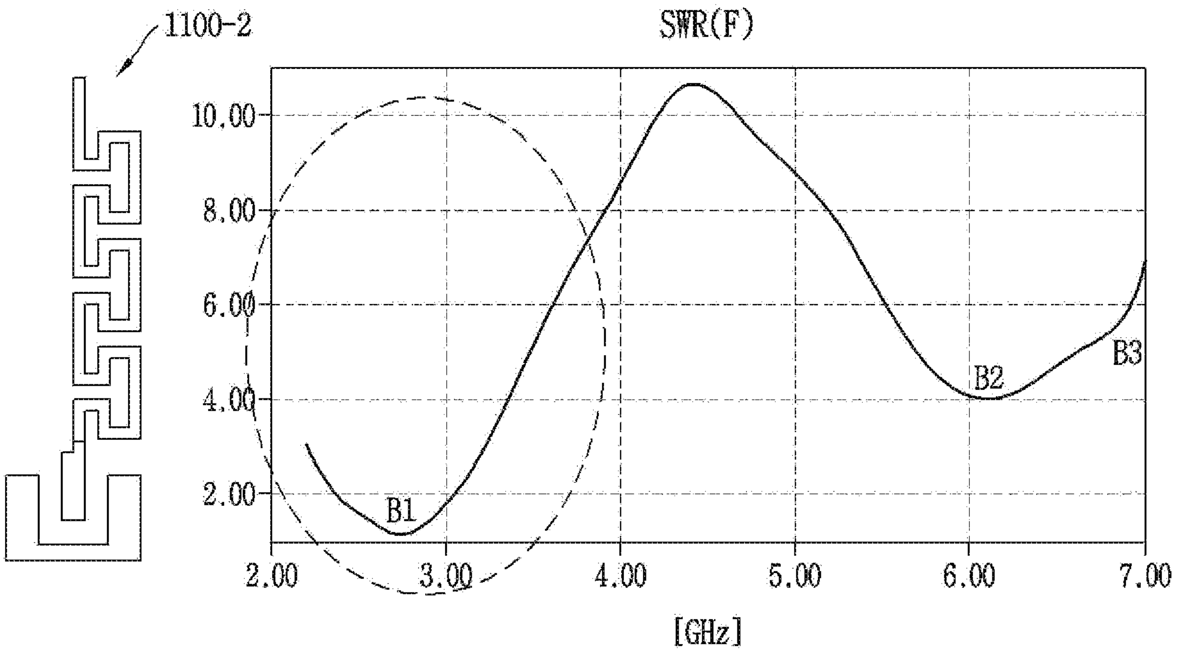

In this regard, FIGS. 12A and 12B compare the VSWR results of a first structure with a second branch and a second structure without a second branch in a structure in which an antenna element is disposed perpendicular to the PCB. FIGS. 13A and 13B compare the VSWR results of a first structure and a second structure in which the metal patterns of an antenna element are disposed in first and second directions on the same plane as the PCB.

Referring to FIGS. 6 and 12A, a first structure in which the second branch line 1100-B2 is formed at the end of the first branch line 1100-B1 may obtain a value of VSWR equal to or lower than a threshold value in a first band B1, a second band B2, and a third band B3, to thus operate as a radiator. The first structure may obtain a VSWR of 3.0 or less in the first band B1, the second band B2, and the third band B3, to thus operate as a radiator. The first band B1 may be defined as a first WiFi band of a low band including 2.45 GHz. The second band B2 may be defined as a second WiFi band of a mid-band including 5.5 GHz. The third band B3 may be defined as a third WiFi band of a high band including 6.5 GHz.

Referring to FIGS. 6 and 12B, a second structure in which a second branch line is not formed at the end of the first branch line 1100-B1 may obtain VSWR characteristics which are slightly deteriorated in the first band B1, the second band B2, and the third band B3. It can be seen that the resonance frequency of the first band B1 in the second structure shifts to a slightly lower band compared to the resonance frequency of the first band B1 in the first structure of FIG. 12A. However, the bandwidth characteristics of the first band B1 in the second structure may not be deteriorated compared to the bandwidth characteristics of the first band B1 in the first structure. This may result from that a main radiation region in the first band B1, as illustrated in FIG. 9A, is the first branch line 1100-B1 and the second branch line 1100-B2 does not contribute to radiation.

In addition, it can be seen that the resonance frequencies of the second band B2 and the third band B3 in the second structure shift to higher bands than the resonance frequencies of the second band B2 and the third band B3 of the first structure of FIG. 12A, and the VSWR value also increases. Therefore, the second structure in which a second branch line is not formed at the end of the first branch line 1100-B1 may obtain VSWR characteristics which are slightly deteriorated in the first band B1, the second band B2, and the third band B3, compared to the first structure.

Referring to FIGS. 6B, 8A, 8B, 13A, and 13B, the antenna element 1100-1, 1100-2 with the first branch line 1100-B1 and the second branch line 1100-B2 that include the first metal pattern 1110-1 through the fifth metal pattern 1110-5 may be formed perpendicular to the PCB 1200. For example, the antenna PCB 1200*a* including the first branch line 1100-B1 and the second branch line 1100-B2 may be formed perpendicular to the PCB 1200. The antenna element 1100-1, 1100-2 or the antenna PCB 1200*a* including the antenna element 1100-1, 1100-2 may be coupled to the PCB 1200 to be rotatable relative to the PCB 1200.

Referring to FIGS. 6B, 8A, and 13A, the antenna element 1100-1 or the antenna PCB 1200*a* on which the antenna element 1100-1 is formed may be configured to be disposed on the same plane as the PCB 1200. The first branch line 1100-B1 including the first metal pattern 1110 to the fifth metal pattern 1150 may be disposed parallel to the first axis of the PCB 1200, so that the antenna element 1100-1 operates with a first polarization. Accordingly, the antenna element 1100-1 may operate as a radiator with the first polarization (horizontal polarization) in which an electric field is formed along the first axis (x-axis).

In this regard, the resonance characteristics of the antenna element 1100-1 having the first polarization (horizontal polarization) may be somewhat deteriorated in the first band B1. It can be seen that the resonance frequency of the antenna element 1100-1 having the first polarization (horizontal polarization) shifts from the first band B1 to a low band. Additionally, the resonance characteristics of the antenna element 1100-1 having the first polarization (horizontal polarization) may also be somewhat deteriorated in the second band B2 and the third band B3. It can be seen that the resonance frequency of the antenna element 1100-1 with the first polarization (horizontal polarization) shifts to a high band from the second band B2 and the third band B3 and the VSWR value also increases.

Referring to FIGS. 6B, 8A, and 13B, the antenna element 1100-2 or the antenna PCB 1200*a* on which the antenna element 1100-2 is disposed may be configured to be disposed on the same plane as the PCB 1200. The first branch line 1100-B1 including the first metal pattern 1110 to the fifth metal pattern 1150 may be disposed perpendicular to the first axis of the PCB 1200, so that the antenna element 1100-2 operates with a second polarization. Accordingly, the antenna element 1100 may operate as a radiator with the second polarization (horizontal polarization), which forms an electric field on the second axis (y axis).

In this regard, it can be seen that the resonance frequency of the antenna element 1100-2 having the second polarization (vertical polarization) shifts from the first band B1 to a slightly low band, compared to FIG. 12A. However, the bandwidth characteristics of the first band B1 in the structure of FIG. 13B may not be deteriorated compared to the bandwidth characteristics of the first band B1 in the structure of FIG. 12A. This may result from that a main radiation region in the first band B1, as illustrated in FIG. 9A, is the first branch line 1100-B1 and the second branch line 1100-B2 does not contribute to radiation.

Additionally, the resonance characteristics of the antenna element 1100-2 having the second polarization (vertical polarization) may also be somewhat deteriorated in the second band B2 and the third band B3. It can be seen that the resonance frequency of the antenna element 1100-2 with the second polarization (vertical polarization) shifts to a high band from the second band B2 and the third band B3 and the VSWR value also increases.

Referring to FIGS. 6B, 8A, 8B, and 12A to 13B, hereinafter, a description will be given of the structure in which the first and second branch lines 1100-B1 and 1100-B2 are perpendicularly disposed in the upper region of the PCB 1200 as illustrated in FIGS. 6 and 12A, among those antenna structures according to the present disclosure. In this regard, FIGS. 14A and 14B are graphs showing the VSWR characteristics, radiation efficiency, and total efficiency of the wideband antenna structure of FIG. 6B.

Figure 14A:
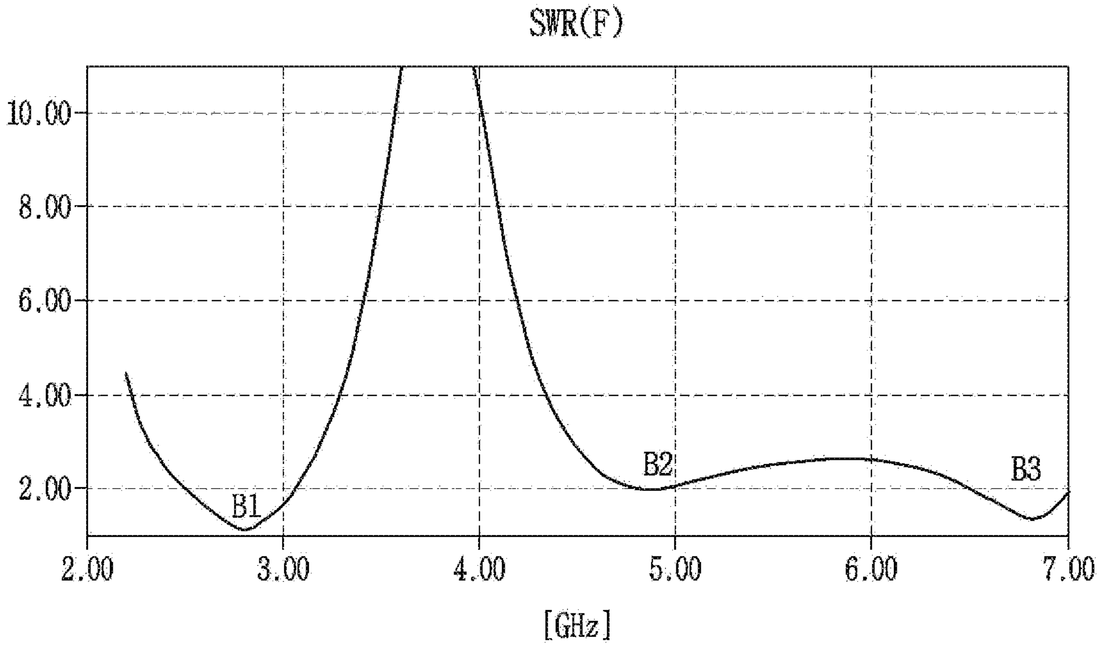
FIG. 14A illustrates the VSWR characteristics of the wideband antenna structure of FIG. 6B.

FIG. 14A illustrates the VSWR characteristics of the wideband antenna structure of FIG. 6B. FIG. 14B illustrates the radiation efficiency and total efficiency of the wideband antenna structure of FIG. 6B.

Referring to FIGS. 6B, 12A, and 14A, the antenna element 1100 in which the first and second branch lines 1100-B1 and 1100-B2 are perpendicularly disposed in the upper region of the PCB 1200 may operate as a radiator in the first band B1, the second band B2, and the third band B3. As described above, the first structure in which the second branch line 1100-B2 is disposed at the end of the first branch line 1100-B1 may obtain a value of VSWR equal to or lower than a threshold value in the first band B1, the second band B2, and the third band B3, to thus operate as a radiator. The first structure may obtain a VSWR of 3.0 or less in the first band B1, the second band B2, and the third band B3, to thus operate as a radiator. The first band B1 may be defined as a first WiFi band of a low band including 2.45 GHz. The second band B2 may be defined as a second WiFi band of a mid-band including 5.5 GHz. The third band B3 may be defined as a third WiFi band of a high band including 6.5 GHz. The antenna element 1100 covering the second band B2 and the third band B3 may cover the band for WiFi 6/WiFi 7 communications.

Figure 14B:
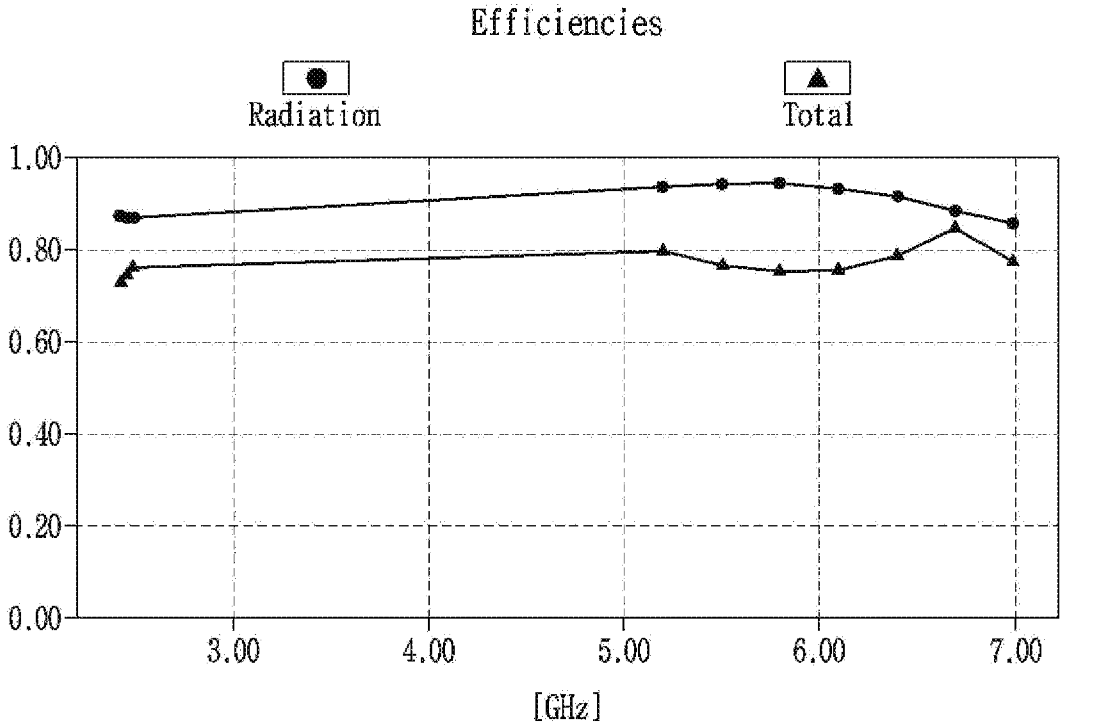
FIG. 14B illustrates the radiation efficiency and total efficiency of the wideband antenna structure of FIG. 6B.

Referring to FIGS. 6B, 12A, and 14B, the antenna element 1100 may have radiation efficiency of about 80% or more in the full band of the first band B1, the second band B2, and the third band B3. Additionally, the antenna element 1100 may have radiation efficiency of about 80% or more in most of the first band B1, the second band B2, and the third band B3. Meanwhile, the total efficiency of the antenna element 1100 may be slightly reduced compared to the radiation efficiency. This may result from that the total efficiency is reduced by a reflected signal in consideration of the VSWR of the antenna element 1100, compared to the radiation efficiency. The antenna element 1100 may obtain total efficiency of about 70% or more in the full band of the first band B1, the second band B2, and the third band B3. Additionally, the antenna element 1100 may obtain total efficiency of about 80% or more in most of the first band B1, the second band B2, and the third band B3.

It will be clearly understood by those skilled in the art that various changes and modifications to the aforementioned embodiments related to the antenna module (antenna system) having the antenna element with the twisted structure are made without departing from the idea and scope of the present disclosure. Therefore, it should be understood that such various changes and modifications to the embodiments fall within the scope of the appended claims.

Figure 15:
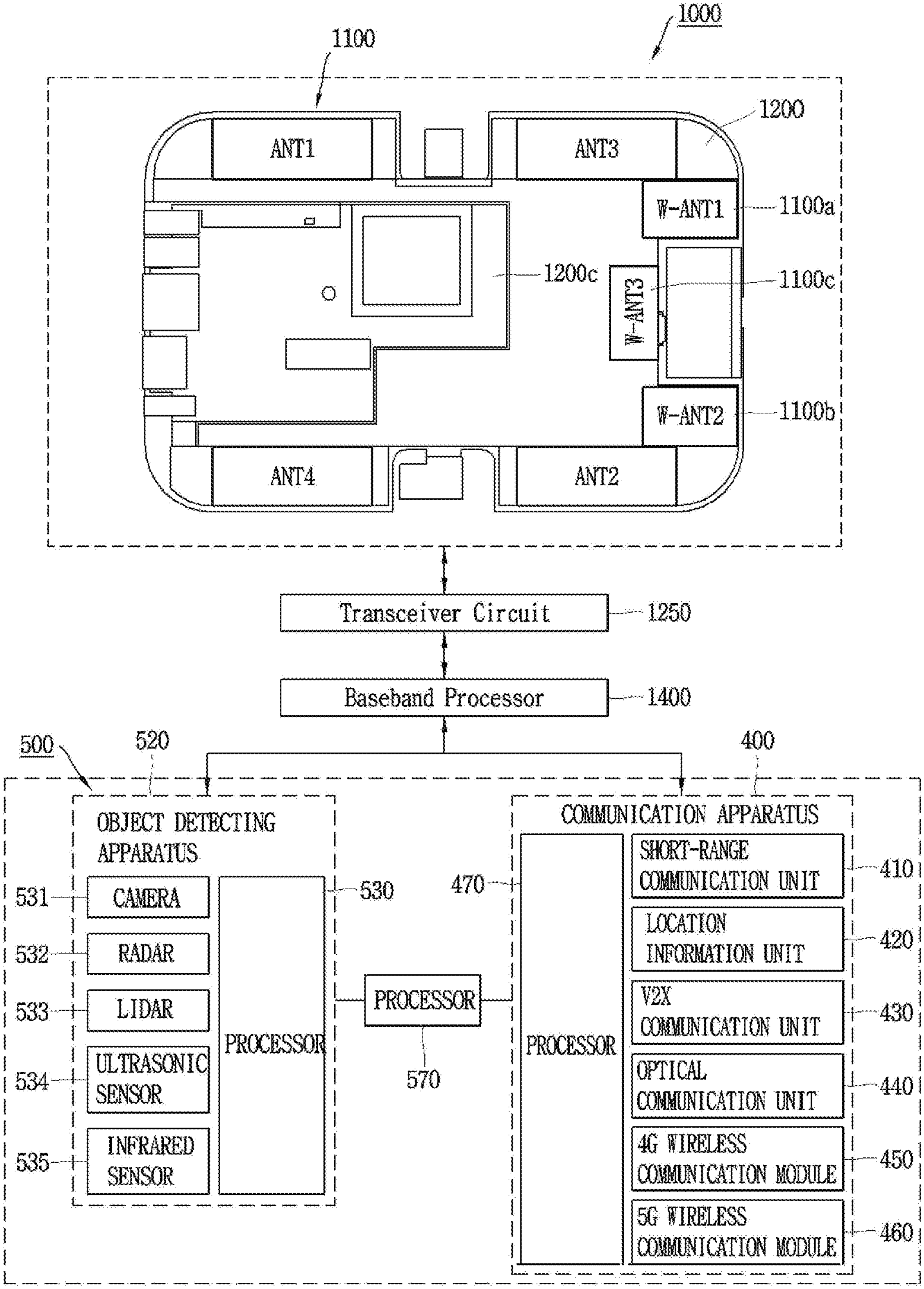
FIG. 15 is a block diagram illustrating an antenna system and a vehicle on which the antenna system is mounted according to the present disclosure.

Meanwhile, FIG. 15 is a block diagram illustrating an antenna system and a vehicle on which the antenna system is mounted according to the present disclosure. Specifically, FIG. 15 is a block diagram of a vehicle illustrating that an antenna module corresponding to an antenna system is mounted inside a roof of the vehicle to perform communications with adjacent electronic devices, vehicles, infrastructures.

Referring to FIG. 15, the wideband antenna module 1000 may be mounted on the vehicle. The antenna module 1000 may perform short-range communication, wireless communication, V2X communication, and the like by itself or through the communication apparatus 400. To this end, the baseband processor 1400 may perform control such that a signal is received from or transmitted to the adjacent vehicle, the RSU, and the base station through the antenna module 1000.

Alternatively, the baseband processor 1400 may perform control such that a signal is received from or transmitted to the adjacent vehicle, the RSU, the adjacent object, and the base station through the communication apparatus 400. Here, the information related to adjacent objects may be acquired through the object detecting apparatus such as the camera 531, the radar 532, the LiDar 533, and the sensors 534 and 535 of the vehicle 300. Alternatively, the baseband processor 1400 may control the communication device 400 and the antenna module 1000 such that a signal is received from or transmitted to the adjacent vehicle, the RSU, the adjacent object, and the base station.

Meanwhile, referring to FIGS. 1A to 15, the vehicle 500 having the antenna module 1000 may include the plurality of antennas 1100, the transceiver circuit 1250, and the baseband processor 1400. The vehicle 500 may further include the object detecting apparatus 520. The vehicle 500 may further include the communication apparatus 400. Here, the communication apparatus 400 may be configured to perform wireless communication through the antenna unit.

Referring to FIGS. 1A to 15, the vehicle 500 may include the antenna module 1000. The antenna module 1000 may be disposed on the bottom of the roof of the vehicle, and perform communication with at least one of an adjacent vehicle, a Road Side Unit (RSU), and a base station through the processor. Since the antenna module 1000 performs telematics operations through wireless communication in the vehicle, it may also be referred to as a telematics module. In this regard, the antenna PCB 1200 in the antenna module 1000 may be coupled with the telematics module 1200*c* that performs a telematics function. In this regard, the antenna PCB 1200 and the telematics module 1200*c* may be combined to interface with each other on the same plane.

Hereinafter, a vehicle 500 having an antenna module 1000 according to another aspect of the present disclosure will be described, with reference to FIGS. 1A to 15. The vehicle 500 may include an antenna module 1000 disposed below the roof of the vehicle. The vehicle 500 may further include a processor 1400 disposed inside or outside the antenna module 1000 and configured to communicate with at least one of an adjacent vehicle, a road side unit (RSU), and a base station.

The antenna module 1000 may include an antenna element 1100 and a PCB 1200. The PCB 1200 may be configured to form a transmission line through which wireless signals are transmitted to the antenna element 1100. The antenna element 1100 may be coupled to the PCB 1200, and may be configured such that metal patterns on one surface thereof are interconnected in a first axial direction and a second axial direction perpendicular to the first axial direction.

The metal patterns may include a first branch line 1100-B1 and a second branch line 1100-B2. The first branch line 1100-B1 may be configured such that metal patterns disposed in the first axial direction have an overlapped length on the second axis. The second branch line 1100-B2 may extend from the end of the first branch line 1100-B1 connected with the PCB 1200 to a portion parallel to the PCB 1200, and may be disposed perpendicular to the PCB 1200.

The first branch line 1100-B1 may be configured to include a plurality of metal patterns. As an example, the first branch line 1100-B1 may include a first metal pattern 1110 to a fifth metal pattern 1150. Each of the first to fifth metal patterns 1110 to 1150 may include a plurality of sub-metal patterns segmented on the first axis or the second axis.

The first metal patterns 1110 may be disposed parallel to the second axis in a segmented form at a first point on the first axis. The second metal patterns 1120 may be disposed parallel to the second axis in a segmented form at a second point on the first axis. The second metal patterns 1120 may be disposed parallel to the first metal patterns 1110 in a segmented form at the second point on the first axis. The third metal patterns 1130 may be disposed parallel to the second axis in a segmented form at a third point on the first axis. The third metal patterns 1130 may be disposed parallel to the second metal patterns 1120 in a segmented form at the third point on the first axis.

The fourth metal patterns 1140 may be configured to connect the first metal patterns 1110 and the second metal patterns 1120. Each of the fourth metal patterns 1140 may be disposed parallel to the first axis in a segmented form. The fifth metal patterns 1150 may be configured to connect the second metal patterns 1120 and the third metal patterns 1130. Each of the fifth metal patterns 1150 may be disposed parallel to the first axis in a segmented form.

The first branch line 1100-B1 may be configured to have an overlapped length on the second axis, and the antenna element 1100 may form a low-elevation beam pattern by a vertical current component on the second axis. In this regard, the second metal patterns 1120 may be disposed to have overlapped lengths with the first metal patterns 1110 and the third metal patterns 1130 on the second axis. The antenna element 1100 may form a low-elevation beam pattern by the vertical current component on the second axis of the first to third metal patterns 1110 to 1130 having the overlapped lengths.

The antenna element 1100 may operate as a radiator in the first band by currents, which are formed in the first direction on the second axis of the first metal pattern 1110 and the third metal pattern 1130, which configure the first branch line 1100-B1. On the other hand, the antenna element 1100 may operate as a radiator in the second band higher than the first band by current, which is formed in the first direction by the metal patterns, disposed in the second axial direction, among the metal patterns constituting the second branch line 1100-B2. Furthermore, the antenna element 1100 may operate as a radiator in the third band higher than the second band by current, which is formed in the first direction by the metal patterns, disposed in the second axial direction, among the metal patterns constituting the first branch lines 1100-B1 and the second branch line 1100-B2. Accordingly, the antenna element 1100 may operate as a radiator in the full WiFi band including the first to third bands. Additionally, the antenna element 1100 may form a low-elevation beam pattern by current formed in the first direction corresponding to an upward direction.

Various types of antenna elements may be disposed in the antenna module 1000 disclosed herein. Each type of antenna elements may also be implemented with multiple antenna elements to implement MIMO. A plurality of antennas may be disposed for 4G/5G communications. The plurality of antennas may include a first antenna ANT1 and a second antenna ANT2. The plurality of antennas may include a third antenna ANT3 and a fourth antenna ANT4.

On the other hand, a plurality of antennas may be disposed for WiFi communications. As an example, the plurality of antennas for WiFi communications may include a first antenna (W-ANT1) 1100*a* and a second antenna (W-ANT1) 1100*b* that are configured with antenna elements each including the first branch line 1100-B1 and the second branch line 1100-B2. The positions where the first antenna (W-ANT1) 1100*a* and the second antenna (W-ANT2) 1100*b* are placed are not limited to the specific positions on the antenna PCB 1200*a* of FIG. 15 but may change depending on applications.

The processor 1400 may perform MIMO in the first band through the first antenna (W-ANT1) 1110*a* and the second antenna (W-ANT2) 1100*b*. The processor 1400 may control signals to be transmitted and received in the first band only through the first antenna (W-ANT1) 1100*a* or the second antenna (W-ANT2) 1100*b*. Accordingly, the processor 1400 can perform switching between a multi-transmission mode such as a MIMO mode and a single transmission mode in the first band depending on a communication environment.

The processor 1400 may perform MIMO in the second band and/or third band, which are higher than the first band, through the first antenna (W-ANT1) 1110*a* and the second antenna (W-ANT2) 1100*b*. The processor 1400 may control signals to be transmitted and received in the second band and/or third band through the first antenna (W-ANT1) 1100*a* or the second antenna (W-ANT2) 1100*b*. Accordingly, the processor 1400 can perform switching between a multi-transmission mode such as a MIMO mode and a single transmission mode in the second band and/or third band depending on a communication environment.

Meanwhile, the twisted antenna structure according to the present disclosure may be configured at various disposition angles. In this regard, the first antenna (W-ANT1) 1100*a* and the second antenna (W-ANT2) 1100*b* may be coupled with the PCB 1200 to be rotatable relative to the PCB 1200. The processor 1400 may rotate at least one of the first antenna (W-ANT1) 1110*a* and the second antenna (W-ANT2) 1100*b* to be disposed parallel to the PCB 1200. When both the first antenna (W-ANT1) 1100*a* and the second antenna (W-ANT2) 1100*b* are disposed parallel to the PCB 1200, the processor 1400 may control the polarizations of the first antenna (W-ANT1) 1100*a* and the second antenna (W-ANT2) 1100*b* to be orthogonal to each other. The processor 1400 may control first and second polarizations of the first antenna (W-ANT1) 1100*a* and the second antenna (W-ANT2) 1100*b* to be orthogonal to each other by rotating one of the first antenna (W-ANT1) 1100*a* and the second antenna (W-ANT2) 1100*b* to be perpendicular to the first axis of the PCB 1200.

As another example, the first antenna (W-ANT1) 1100*a* may be disposed perpendicular to the PCB 1200, and the second antenna (W-ANT2) 1100*b* may be disposed parallel to the PCB 1200. Additionally, the third antenna (W-ANT3) 1100*c* may be disposed parallel to the PCB 1200. The second antenna (W-ANT2) 1100*b* may be disposed parallel to the first axis of the PCB 1200, and the third antenna (W-ANT3) 1100*c* may be disposed perpendicular to the first axis of the PCB 1200.

When a signal received through the first antenna (W-ANT1) 1100*a* is equal to or lower than a threshold value, the processor 1400 may control a signal to be transmitted and received through one of the second antenna (W-ANT2) 1100*b* and the third antenna (W-ANT3) 1100*c*. The processor 1400 may perform MIMO through the second antenna (W-ANT2) 1110*b* and the third antenna (W-ANT3) 1100*c*. In this regard, the positions of the first antenna (W-ANT1) 1100*a* to the third antenna (W-ANT3) 1100*c* are not limited to those in the structure of FIG. 15 but may change in various ways depending on applications. It will be clearly understood by those skilled in the art that various modifications and alternations for the aforementioned embodiments related to the antenna module having the plurality of antennas, the vehicle having the antenna module mounted thereon, and the control operations thereof are made without departing from the idea and scope of the present disclosure. Therefore, it should be understood that such various modifications and alternations for the embodiments fall within the scope of the appended claims.

The transceiver circuit 1250 may be operably coupled to each radiator module 1100. The processor 1400 may be operably coupled to the transceiver circuit 1250. The processor 1400 may be a baseband processor corresponding to a modem, but is not limited thereto and may be any processor that controls the transceiver circuit 1250. The processor 1400 of the vehicle may be implemented as a network access device (NAD).

The transceiver circuit 1250 may be operably coupled to the MIMO antennas ANT1 to ANT4. The transceiver circuit 1250 may include a front end module (FEM) such as a power amplifier or a receiving amplifier. As another example, the front end module (FEM) may be disposed between the transceiver circuit 1250 and the antenna, separately from the transceiver circuit 1250. The transceiver circuit 1250 may control the amplitude and/or phase of signals transmitted to the MIMO antennas ANT1 to ANT4 or control only some antenna modules to operate by adjusting the gain or input or output power of the power amplifier or the receiving amplifier.

The processor 1400 may be operably coupled to the transceiver circuit 1250 and may be configured to control the transceiver circuit 1250. The processor 1400 may control the transceiver circuit 1250 to control the amplitude and/or phase of the signals transmitted to the MIMO antennas ANT1 to ANT4 or to operate only some antenna modules. The processor 1400 may perform communication with at least one of the adjacent vehicle, the RSU, and the base station through the transceiver circuit 1250.

In a case where there is a need to simultaneously receive information from various entities such as the adjacent vehicle, the RSU, and the base station for autonomous driving, etc., information may be received and transmitted through MIMO. Accordingly, the vehicle can receive different information from various entities at the same time and thus can improve its communication capacity. Therefore, the communication capacity of the vehicle can be improved through the MIMO without increasing a bandwidth.

Alternatively, the vehicle may simultaneously receive the same information from various entities, so as to improve reliability of surrounding information and decrease latency. Accordingly, Ultra Reliable Low Latency Communication (URLLC) can be performed in the vehicle and the vehicle can operate as a URLLC UE. To this end, a base station that performs scheduling may preferentially allocate a time slot for the vehicle operating as the URLLC UE. For this, some of specific time-frequency resources already allocated to other UEs may be punctured.

As described above, the plurality of antennas ANT1 to ANT4 for 4G/5G communication within the antenna module 1000 may operate in the full band including the low band (LB), the mid band (MB), and the high band (HB). Here, the low band (LB) may be referred to as the first (frequency) band and the mid band (MB) and the high band (HB) may be referred to as the second (frequency) band. As another example, when the antenna system 1000 operates in the mid band (MB) and the high band (HB), the middle band (MB) is referred to as a first (frequency) band and the high band (HB) is referred to as a second (frequency) band. The 5G SUB6 band may be the same band as the LTE band in case of LTE re-farming. When 5G NR operates in a band separate from LTE, it may operate in the high band (HB) or a higher band. The 5G SUB6 band operating in the high band (HB) or higher band may also be referred to as a second (frequency) band.

The baseband processor 1400 can perform MIMO through some of the plurality of antenna elements ANT1 to ANT4 in the first frequency band. Also, the baseband processor 1400 can perform MIMO through some of the plurality of antenna elements ANT1 to ANT4 in the second frequency band. In this regard, the baseband processor 1400 can perform MIMO by using antenna elements that are sufficiently spaced apart from each other and disposed by being rotated at a predetermined angle. This can improve isolation between the first and second signals within the same band.

The baseband processor 1400 may control the transceiver circuit 1250 to receive the second signal of the second frequency band while receiving the first signal of the first frequency band through one of the first to fourth antennas ANT1 to ANT4. In this case, there may be provided an advantage that the baseband processor 1400 can advantageously perform carrier aggregation (CA) through one antenna.

Alternatively, the baseband processor 1400 may control the transceiver circuit 1250 to receive the second signal of the second frequency band through one of the third antenna ANT3 and the fourth antenna ANT4 while receiving the first signal of the first frequency band through one of the first antenna ANT1 and the second antenna ANT2. In this case, there may be provided an advantage that each antenna can be designed to optimally operate in a corresponding band.

Therefore, the baseband processor 1400 can perform carrier aggregation (CA) through a combination of the first frequency band and the second frequency band. When it is necessary to receive a large amount of data for autonomous driving or the like, reception in a broad band can be allowed through the CA.

Accordingly, eMBB (Enhanced Mobile Broad Band) communication can be performed in the vehicle and the vehicle can operate as an eMBB UE. To this end, the base station that performs scheduling may allocate a broadband frequency resource to the vehicle that operates as the eMBB UE. To this end, the CA may be performed on frequency bands that are available, except for frequency resources already allocated to other UEs.

Regard the frequency band, the low band (LB), the mid band (MB), and the high band (HB) may be referred to as the first band, the second band, and the third band, respectively. The antenna system 1000 may operate as a single antenna in the first band, the second band, and the third band corresponding to the low band (LB), the middle band (MB), and the high band (HB). In this regard, the processor 1400 may determine a resource region allocated through a physical downlink control channel (PDCCH). The processor 1400 may control the transceiver circuit 1250 to perform carrier aggregation in two or more of the first to third bands based on the allocated resource region.

The processor 1400 may perform MIMO in an EN-DC state through the first to fourth antennas ANT1 to ANT4. For example, the processor 1400 may perform an EN-DC operation through the first antenna ANT1 and the second antenna ANT2, and MIMO through the third antenna ANT3 and the fourth antenna ANT4.

In this regard, when the EN-DC operation is performed between a 4G/5G communication system and a WiFi communication system using different bands, the processor 1400 may perform the EN-DC operation through a plurality of antennas in one antenna system. Accordingly, an interference level between MIMO streams using the same band can be reduced. On the other hand, when the EN-DC operation is performed between the 4G and 5G communication systems using the same band, the processor 1400 may perform the EN-DC operation through a plurality of antennas in different antenna systems. In this case, in order to reduce the interference level in the low band (LB), the MIMO operation through the plurality of antennas in the same antenna system may be performed in the mid band (MB) or higher.

It will be clearly understood by those skilled in the art that various modifications and alternations for the aforementioned implementations related to the antenna system having the plurality of antennas, the vehicle having the antenna system, and the control operations thereof are made without departing from the idea and scope of the present disclosure. Therefore, it should be understood that such various modifications and alternations for the implementations fall within the scope of the appended claims.

In the above, the antenna module mounted on the vehicle and the vehicle including the antenna module have been described. Hereinafter, the technical effects of the antenna module mounted on the vehicle and the vehicle having the antenna module will be described.

According to the present disclosure, a wideband antenna can be implemented in a vehicle using metal patterns with a twisted structure.

According to the present disclosure, a wideband antenna can be implemented in a vehicle using metal patterns with a twisted structure, which is formed on an antenna PCB coupled to a PCB.

According to the present disclosure, a low-elevation beam pattern can be implemented through the twisted structure of vertical/horizontal branch lines.

According to the present disclosure, a high-efficiency wideband antenna for vehicle can be implemented using metal patterns with a twisted structure, which is formed on an antenna PCB vertically coupled to a PCB.

According to the present disclosure, even when a MIMO antenna in an antenna module does not normally operate, communication can be performed through a backup antenna.

Further scope of applicability of the present disclosure will become apparent from the following detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

In relation to the foregoing description, the antenna system mounted in the vehicle and the operation of controlling the same may be implemented by software, firmware, or a combination thereof. Meanwhile, the design of the antenna system mounted in the vehicle and the configuration of controlling the antenna system can be implemented as computer-readable codes in a program-recorded medium. The computer-readable medium may include all types of recording devices each storing data readable by a computer system. Examples of such computer-readable media may include hard disk drive (HDD), solid status disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may also include a controller of a terminal or vehicle, namely, a processor. Therefore, the detailed description should not be limitedly construed in all of the aspects, and should be understood to be illustrative. The scope of the invention should be determined by reasonable interpretation of the appended claims and all changes that come within the equivalent scope of the invention are included in the scope of the disclosure.

The invention claimed is:

1. An antenna module mounted on a vehicle, the antenna module comprising:

a printed circuit board (PCB) with transmission lines formed thereon; and an antenna element coupled to the PCB, and configured such that metal patterns on one surface thereof are interconnected in a first axial direction and a second axial direction perpendicular to the first axial direction, wherein the metal patterns comprise:

a first branch line configured such that metal patterns disposed in the first axial direction have an overlapped length on the second axis;

a second branch line extending from an end of the first branch line connected to the PCB to a portion parallel to the PCB, to be perpendicular to the PCB, and wherein the antenna element on which the first branch line and the second branch line are formed is disposed perpendicular to the PCB, and the antenna element is coupled to the PCB to be rotatable relative to the PCB.

2. The antenna module of claim 1, wherein the first branch line comprises:

first metal patterns disposed parallel to the second axis in a segmented form at a first point on the first axis;

second metal patterns disposed parallel to the first metal patterns in a segmented form at a second point on the first axis;

third metal patterns disposed parallel to the second metal patterns in a segmented form at a third point on the first axis;

fourth metal patterns configured to connect the first metal patterns and the second metal patterns and disposed parallel to the first axis; and fifth metal patterns configured to connect the second metal patterns and the third metal patterns, and disposed parallel to the first axis.

3. The antenna module of claim 2, wherein the second metal patterns are disposed to have an overlapped length with the first metal patterns and the third metal patterns on the second axis, and the antenna element forms a low-elevation beam pattern by a vertical current component on the second axis of the first to third metal patterns having the overlapped length.

4. The antenna module of claim 2, wherein the fourth metal patterns disposed in parallel on the first axis are alternately disposed on the second axis at a first spacing and a second spacing wider than the first spacing, and the fifth metal patterns disposed in parallel on the first axis are alternately disposed on the second axis at a third spacing and a fourth spacing narrower than the third spacing.

5. The antenna module of claim 4, wherein currents are formed in opposite directions in the first metal pattern and the second metal pattern disposed to have a first spaced distance on the first axis and a first overlapped length on the second axis, to form a first capacitive component of the antenna element, and currents are formed in opposite directions in the second metal pattern and the third metal pattern disposed to have a second spaced distance on the first axis and a second overlapped length on the second axis, to form a second capacitive component of the antenna element.

6. The antenna module of claim 4, wherein currents are formed in opposite directions on the first axis in metal patterns, disposed at the first spacing on the second axis, among the fourth metal patterns, to form a third capacitive component of the antenna element, and currents are formed in opposite directions on the first axis in metal patterns, disposed at the fourth spacing on the second axis, among the fifth metal patterns, to form a fourth capacitive component of the antenna element.

7. The antenna module of claim 6, wherein the antenna element forms a first inductive component by an antenna length by the first to fifth metal patterns, and forms a second inductive component by current formed in a first direction on the second axis in the first metal pattern and the third metal pattern, and forms a third inductive component by current formed in a second direction on the second axis in the second metal pattern, and the antenna element operates as a radiator in the first to third bands by a combination of the first to third inductive components and the first to fourth capacitive components.

8. The antenna module of claim 7, wherein the antenna element forms a fourth inductive component by a first combination of metal patterns, in which current is formed equally in a first direction on the first axis, and a second combination of metal patterns, in which current is formed equally in a second direction on the first axis, among the fourth metal patterns, and forms a fifth inductive component by a first combination of metal patterns, in which current is formed equally in the first direction on the first axis, and a second combination of metal patterns, in which current is formed equally in the second direction on the first axis, among the fifth metal patterns, and the antenna element operates as a radiator in first to third bands by a combination of the first to fifth inductive components and the first to fourth capacitive components.

9. The antenna module of claim 2, wherein the antenna element operates as a radiator in a first band by current, which is formed in a first direction on the second axis in the first metal pattern and the third metal pattern constituting the first branch line, and forms a low-elevation radiation pattern in the first band by current, which is formed vertical to the first branch line corresponding to an upper region of the second branch line.

10. The antenna module of claim 9, wherein the antenna element operates as a radiator in a second band higher than the first band by current, which is formed in a first direction by metal patterns, disposed in the second axial direction, among metal patterns constituting the second branch line, and forms a low-elevation radiation pattern in the second band by current formed vertical to the second branch line.

11. The antenna module of claim 10, wherein the antenna element operates as a radiator in a third band higher than the second band by current, which is formed in the first direction by metal patterns, disposed in the second axial direction, among metal patterns constituting the first branch line and the second branch line, and forms a low-elevation radiation pattern in the third band by currents formed vertical to the first branch line and the second branch line.

12. The antenna module of claim 2, wherein the first to fifth metal patterns operate as a radiator having twist-shaped metal patterns, in which currents are formed in opposite directions.

13. The antenna module of claim 2, wherein the fourth metal patterns alternately have a first structure with a pair of adjacent metal patterns disposed at a first spacing and a second structure with a pair of adjacent metal patterns disposed at a second spacing larger than the first spacing on the second axis, the fifth metal patterns alternately have the second structure with a pair of adjacent metal patterns disposed at the second spacing and the first structure with a pair of adjacent metal patterns disposed at the first spacing smaller than the second spacing on the second axis, and the first to fifth metal patterns operate as a radiator having twist-shaped metal patterns, in which currents are formed in the opposite directions, through the structure in which the fourth metal patterns are disposed in parallel at the first spacing and the second spacing and the structure in which the fifth metal patterns are disposed in parallel at the second spacing and the first spacing.

14. The antenna module of claim 13, wherein the first to fifth metal patterns comprise:

a first metal pattern pair that is disposed in parallel in the first axial direction or the second axial direction and forms currents in the same direction; and a second metal pattern pair that is disposed in parallel in the first axial direction or the second axial direction and forms currents in opposite directions, and the first metal pattern pair forms an inductive component of the antenna element, and the second metal pattern pair forms an inductive component of the antenna element.

15. The antenna module of claim 2, wherein the antenna element is disposed on the same plane as the PCB, and the first branch line including the first to fifth metal patterns is disposed in parallel to the first axis of the PCB, so that the antenna element operates with a first polarization.

16. The antenna module of claim 2, wherein the antenna element is disposed on the same plane as the PCB, and the first branch line including the first to fifth metal patterns is disposed perpendicular to the first axis of the PCB, so that the element operates with a second polarization.

17. A vehicle having an antenna module, the vehicle comprising:

an antenna module disposed on a bottom of a roof of the vehicle or on glass of the vehicle; and a processor disposed inside or outside the antenna module, and configured to communicate with at least one of an adjacent vehicle, a road side unit (RSU), and a base station, the antenna module comprises:

a printed circuit board (PCB) with transmission lines formed thereon; and an antenna element coupled to the PCB, and configured such that metal patterns on one surface thereof are interconnected in a first axial direction and a second axial direction perpendicular to the first axial direction, wherein the metal patterns comprise:

a first branch line configured such that metal patterns disposed in the first axial direction have an overlapped length on the second axis; and a second branch line extending from an end of the first branch line connected with the PCB to a portion parallel to the PCB, to be perpendicular to the PCB, and wherein the antenna element on which the first branch line and the second branch line are formed is disposed perpendicular to the PCB, and the antenna element is coupled to the PCB to be rotatable relative to the PCB.

18. The vehicle of claim 17, wherein the first branch line comprises:

first metal patterns disposed parallel to the second axis in a segmented form at a first point on the first axis;

second metal patterns disposed parallel to the first metal patterns in a segmented form at a second point on the first axis;

third metal patterns disposed parallel to the second metal patterns in a segmented form at a third point on the first axis;

fourth metal patterns configured to connect the first metal patterns and the second metal patterns and disposed parallel to the first axis; and fifth metal patterns configured to connect the second metal patterns and the third metal patterns, and disposed parallel to the first axis.

19. The vehicle of claim 18, wherein the antenna element operates as a radiator in a first band by current, which is formed in a first direction on the second axis in the first metal pattern and the third metal pattern constituting the first branch line, operates as a radiator in a second band higher than the first band by current, which is formed in the first direction by metal patterns, disposed in the second axial direction, among metal patterns constituting the second branch line, and operates as a radiator in a third band higher than the second band by current, which is formed in the first direction by metal patterns, disposed in the second axial direction, among the metal patterns constituting the first branch line and the second branch line, wherein the antenna module comprises a first antenna and a second antenna each configured by the antenna element including the first branch line and the second branch line, and the processor controls a multiple input/multiple output (MIMO) to be performed in the first band through the first antenna and the second antenna, and controls the MIMO to be performed in the second band and the third band higher than the first band through the first antenna and the second antenna, wherein the first and second antennas are coupled to the PCB so as to be rotatable relative to the PCB, and the processor rotates at least one of the first and second antennas to be disposed parallel to the PCB, and when both the first and second antennas are disposed parallel to the PCB, rotates one of the first and second antennas to be disposed perpendicular to the first axis of the PCB, such that first and second polarizations of the first and second antennas are orthogonal to each other.

* * * * *